United States Patent [19]
Saito

[11] Patent Number: 6,130,874
[45] Date of Patent: *Oct. 10, 2000

[54] OPTICAL CARD INFORMATION RECORDING/REPRODUCING APPARATUS WITH DEVICE FOR MOUNTING OPTICAL CARD

[75] Inventor: Makoto Saito, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/634,133

[22] Filed: Apr. 19, 1996

Related U.S. Application Data

[63] Continuation of application No. 08/202,158, Feb. 25, 1994, abandoned.

[30] Foreign Application Priority Data

Feb. 26, 1993 [JP] Japan .................................. 5-061317

[51] Int. Cl.⁷ .............................. G11B 17/00; G06K 7/10
[52] U.S. Cl. ......................... 369/249; 369/251; 235/454
[58] Field of Search .............................. 369/249, 36, 247, 369/75.2, 77.2, 251; 360/105, 75, 137, 96.5; 235/454, 475, 479, 472, 380

[56] References Cited

U.S. PATENT DOCUMENTS

| | | | |
|---|---|---|---|
| 4,574,372 | 3/1986 | d'Alayer de Costemore d'Arc | 369/244 |
| 4,899,328 | 2/1990 | Ishii et al. | 369/77.2 |
| 4,922,351 | 5/1990 | Suzuki et al. | 358/494 |
| 5,060,101 | 10/1991 | Isomura | 360/105 |
| 5,062,099 | 10/1991 | Odawara et al. | 369/247 |
| 5,126,546 | 6/1992 | Hashi | 235/454 |
| 5,274,621 | 12/1993 | Akatsuka | 235/475 |

FOREIGN PATENT DOCUMENTS

| | | |
|---|---|---|
| 0481654 | 4/1992 | European Pat. Off. . |
| 4013266 | 1/1992 | Japan . |
| 04238122 | 8/1992 | Japan . |
| 4238122 | 8/1992 | Japan . |

*Primary Examiner*—Stuart S. Levy
*Assistant Examiner*—Tod Kupstas
*Attorney, Agent, or Firm*—Fitzpatrick, Cella, Harper & Scinto

[57] ABSTRACT

An optical card information recording/reproducing apparatus is provided for recording and/or reproducing information to or from an optical card. The apparatus comprises a mounting base on which the optical card is to be mounted and which moves in a predetermined direction, an optical head for irradiating an optical beam onto the optical card to record and/or reproduce information therein or therefrom, and a locking device for locking the mounting base in an unmovable state during transportation of the apparatus. The locking device may be arranged to lock the optical head in an unmovable state as well.

5 Claims, 27 Drawing Sheets

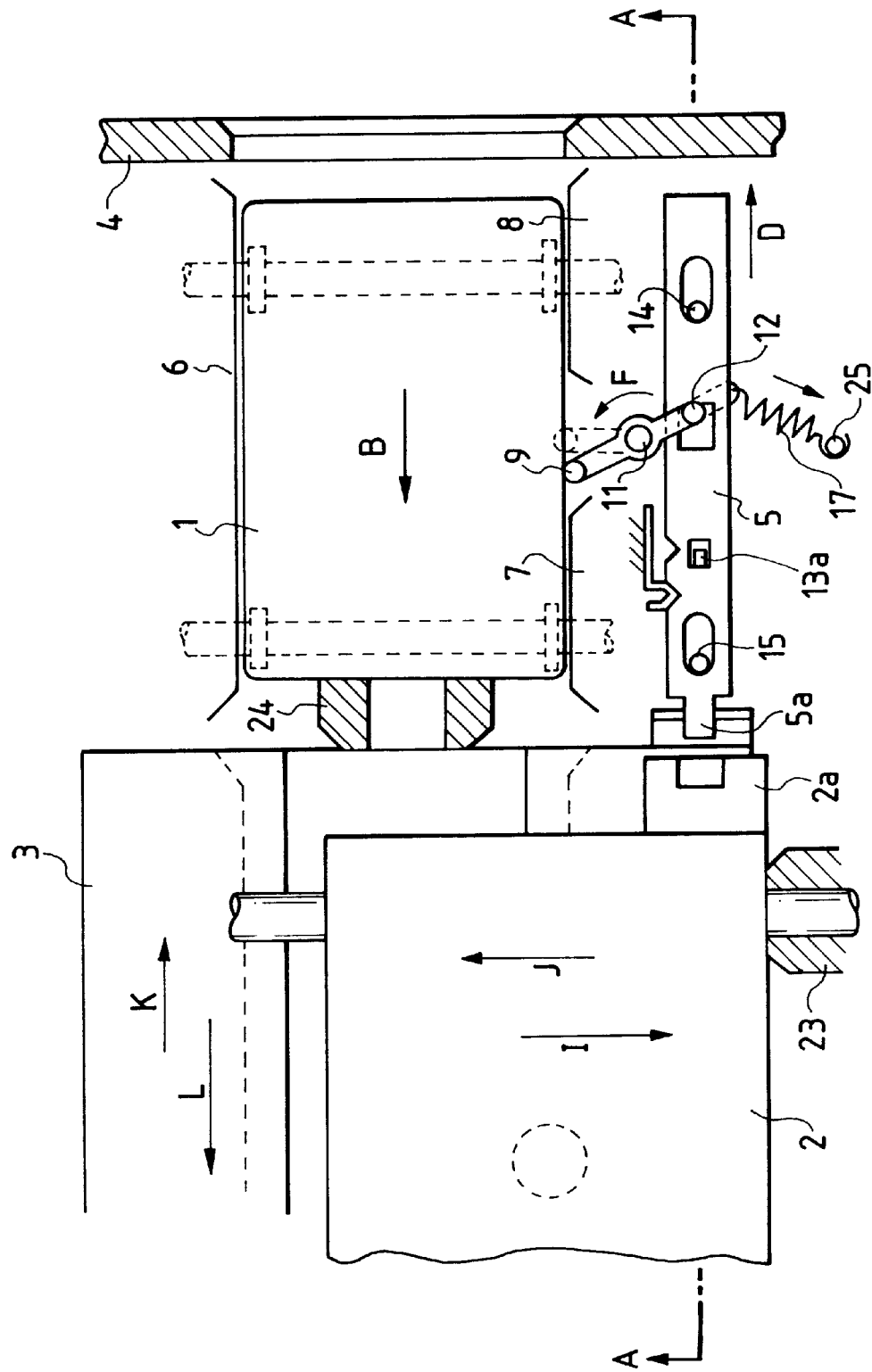

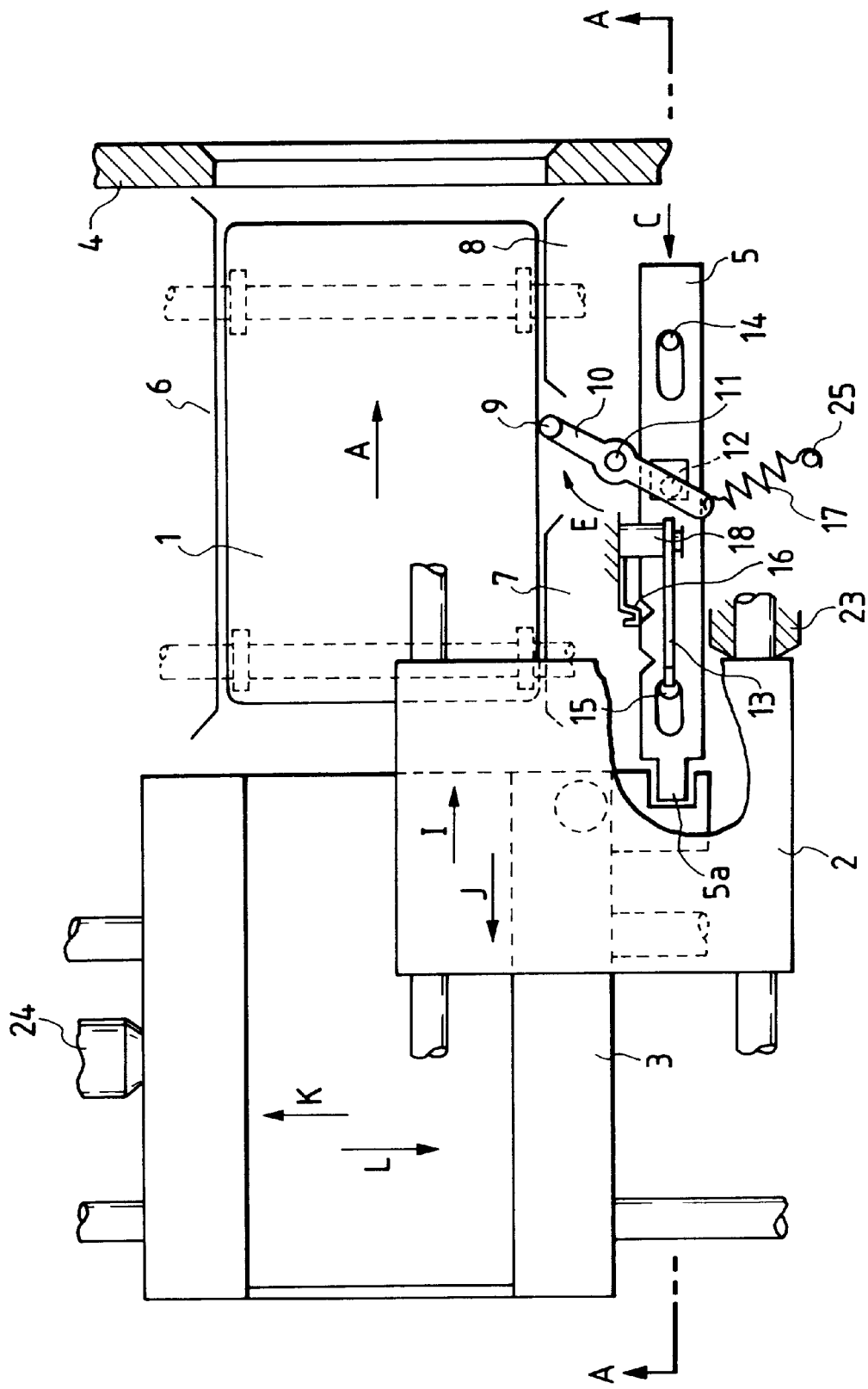

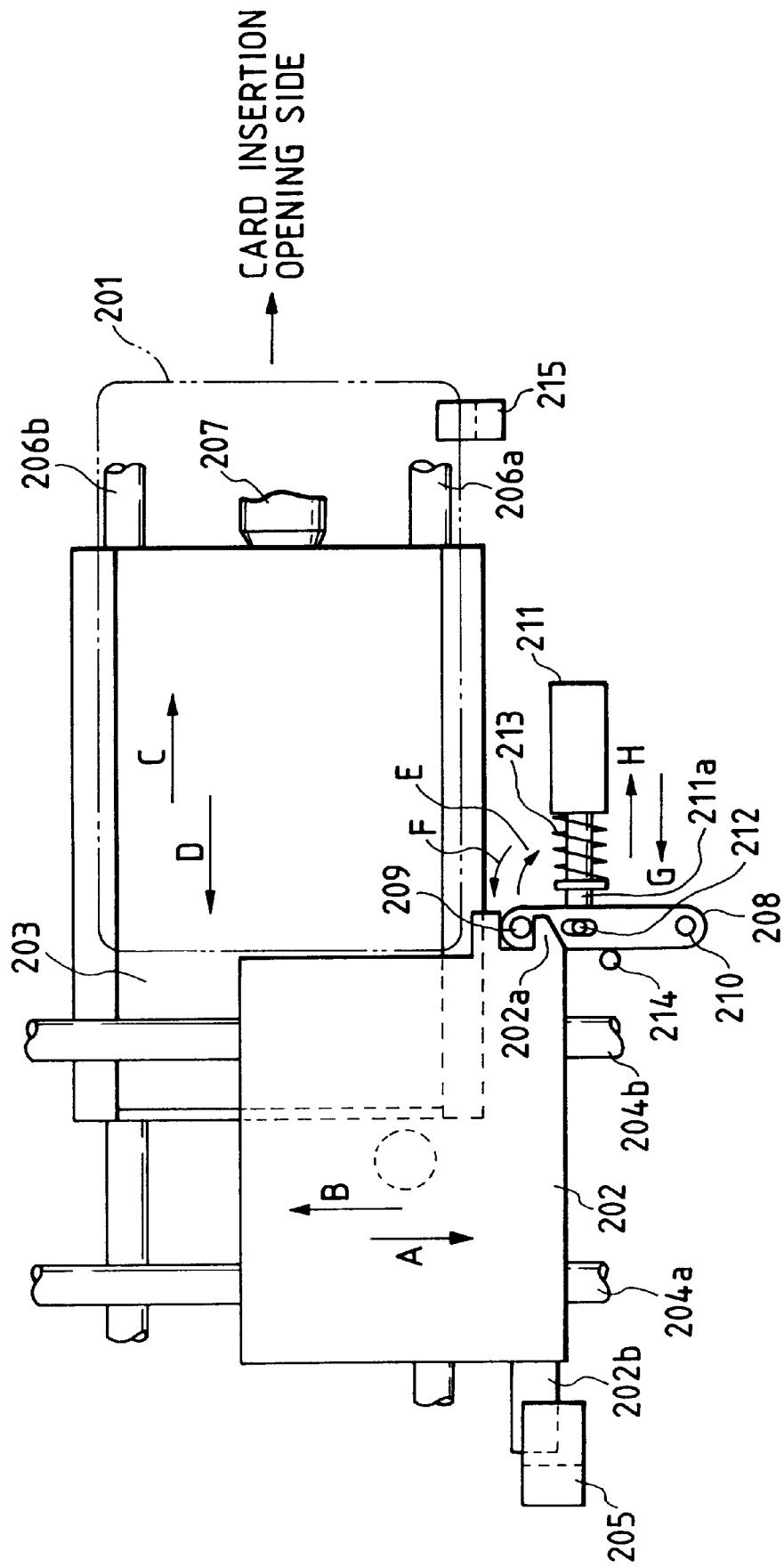

CARD INSERTION OPENING SIDE

EJECTION BUTTON

FLOW CHART UPON LOCKING

FLOW CHART UPON RELEASING LOCKING (CARD INSERTION)

FLOW CHART UPON RELEASING LOCKING (POWER ON)

OPTICAL CARD INFORMATION RECORDING/REPRODUCING APPARATUS WITH DEVICE FOR MOUNTING OPTICAL CARD

This application is a continuation of application Ser. No. 08/202,158 filed Feb. 25, 1994, now abandoned.

BACKGROUND OF THE INVENTION

1. Field of the Invention

The present invention relates to an optical card information recording/reproducing apparatus for recording and/or reproducing information by irradiating an optical beam onto a recording/reproducing surface in an optical or magneto-optical recording medium such as a card (hereinafter referred to as an optical card). More particularly, the invention relates to an optical card information recording/reproducing apparatus provided with a lock mechanism for a mounting base on which the optical card is mounted and for an optical head for irradiating an optical beam onto the optical card to record and/or reproduce information.

2. Related Background Art

An optical card information recording/reproducing apparatus records or reproduces information to or from an optical card, using an optical beam such as a laser beam. The apparatus performs the recording/reproducing of information to the optical card while driving a mounting base (hereinafter referred to as a shuttle) for carrying the optical card and an optical head for irradiating the optical beam onto the optical card in mutually perpendicular directions. Such apparatus had, however, a problem that vibration on the apparatus during transportation thereof caused the optical head and the mounting base to collide with members at the moving end so as to be damaged.

SUMMARY OF THE INVENTION

The present invention has be accomplished taking the problem into account. It is an object of the present invention to provide an optical card information recording/reproducing apparatus which has a simple arrangement to enable prevention of damage to the optical head and/or the shuttle.

The above object can be achieved by an information recording/reproducing apparatus for recording and/or reproducing information in or from a recording medium, comprising:

an optical head for irradiating an optical beam onto said medium to record and/or reproduce information therein or therefrom, which is movable along a surface of said medium; and locking means for locking said optical head in an unmovable state in synchronism with an operation of discharging said medium from said apparatus.

Also, the object can be achieved by an optical card information recording/reproducing apparatus for recording and/or reproducing information in or from an optical card, comprising:

a mounting base on which said optical card is to be mounted and which moves in a predetermined direction;

an optical head for irradiating an optical beam onto said optical card to record and/or reproduce information therein or therefrom; and locking means for locking said mounting base in an unmovable state during transportation of said apparatus.

BRIEF DESCRIPTION OF THE DRAWINGS

FIG. 3 is a plan view to show an operating state of the first embodiment;

FIG. 5 is a plan view of major part to show a modification of the first embodiment;

FIG. 13 is a plan view to show the structure of the third embodiment of the present invention;

DESCRIPTION OF THE PREFERRED EMBODIMENTS

The optical card information recording/reproducing apparatus of the present invention will be described in the concrete and in detail, based on embodiments in the accompanying drawings showing the major part thereof.

First Embodiment

Figure 1:
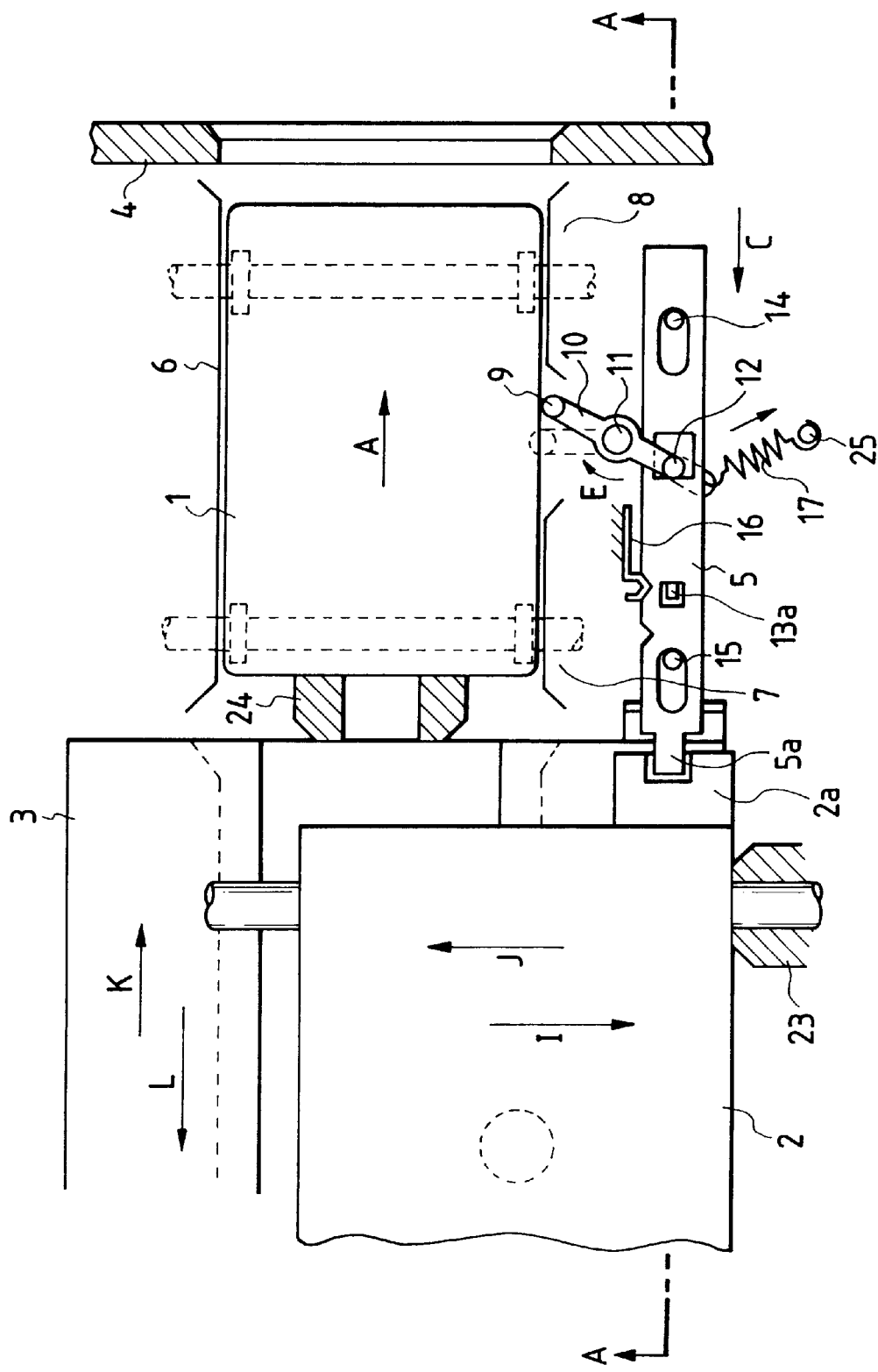
FIG. 1 is a plan view to show the structure of the first embodiment of the present invention.
Figure 2:
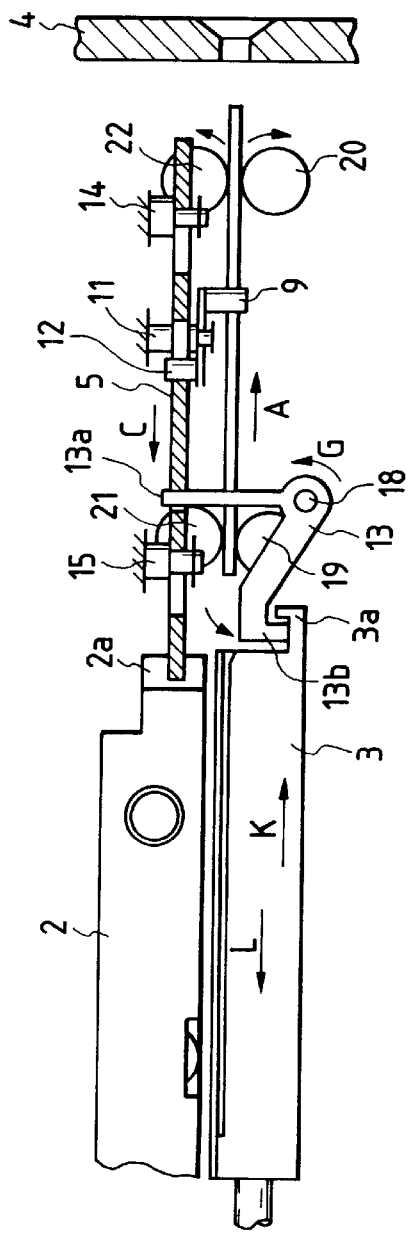
FIG. 2 is a cross section along A—A line in FIG. 1.

FIG. 1 is a plan view to show the structure of an embodiment of optical card information recording/reproducing apparatus according to the present invention. FIG. 1 shows an operating state in which an optical card is removed from a shuttle and an optical head is locked (which is the same state as that during transportation of apparatus). FIG. 2 shows a cross section along A—A in FIG. 1. FIG. 2 shows an operating state in which the shuttle is locked (which is the same state as that during transportation of apparatus). In FIG. 1, reference numeral 1 designates an optical card, 2 an optical head, 3 a shuttle on which the optical card is to be mounted, 6, 7 and 8 card guides, and 10 an actuating lever. A pin 9 and a pin 12 are fixed at either end of the actuating lever 10 which can revolve about a lever shaft 11. A coil spring 17 is stretched between a spring peg 25 and the distal end of the actuating lever 10 near the pin 12, whereby the actuating lever 10 is drawn toward the spring.

Also, numeral 5 denotes a lock plate, which is perforated to have two elongate holes near the both ends thereof and two square holes inside the elongate holes. The pin 12 and an arm 13a of a lock lever 13 are set in the respective square holes while guide pins 14 and 15 in the respective elongate holes. Numeral 16 denotes a spring click, which regulates a motion of the lock plate 5 when it is coupled with a V groove on the edge face of lock plate 5. Numeral 23 is a head stopper and 24 a shuttle stopper. In FIG. 2, the lock lever 13 can rotate about a lever shaft 18. Here, numerals 19, 20 are drive rollers for driving the optical card and numerals 21, 22 are driven rollers.

For the apparatus as so arranged, first described is a locking operation with discharging the optical card, and then described is an unlocking operation with inserting the optical card. In FIG. 1, the optical head 2 movable in the I direction and in the J direction moves along the I direction and stops when it comes into contact with the head stopper 23. This position is a lock position of the head. Also, the shuttle 3 movable in the K direction and in the L direction moves along the K direction and stops when it comes into contact with the shuttle stopper 24. This position is a card insertion and discharge position of the shuttle.

When the optical head 2 and the shuttle 3 stop at the above respective predetermined positions, the optical card 1 is then discharged from the shuttle 3. The optical card 1 is moved by the drive rollers 19, 20 and the driven rollers 21, 22 along the card guides 6, 7 and 8 in the A direction and is finally discharged through a slot 4. In this case, the pin 9 fixed on the actuating lever 10 is arranged to project out as to be located further inward than one side face of the optical card 1 between the card guides 7 and 8. Thus, when the optical card 1 comes to pass by between the card guides 7 and 8, the front end of optical card comes into contact with the pin 9. As the optical card further moves, the side face of optical card 1 urges the pin 9 to rotate the actuating lever 10 in the E direction about the lever shaft 11. On this occasion, the pin 12 fixed on the actuating lever 10 works to move the lock plate 5 along the guide pins 14 and 15 in the C direction. When the spring click 16 is coupled with the V groove in the actuating lever 10, the lock plate 5 is automatically locked. At this moment, the distal end of lock plate 5 enters a groove 2a of the optical head 2, so that the optical head 2 is stopped from moving in the J direction as kept in a lock state. After the optical card 1 passed by the pin 9 fixed on the actuating lever 10, the actuating lever 10 rotates by a biasing force of the tension coil spring 17 and stops at the position where it is most projected out from the card guides 7, 8.

Meanwhile, referring to FIG. 2, when the lock plate 5 moves in the C direction, the lock lever 13 rotates in the G direction about the lever shaft 18, because the arm 13a is set in the square hole in the lock plate 5. This rotation causes a lock portion 13b of the lock lever 13 to enter a groove 3a of the shuttle 3, whereby the shuttle 3 is stopped from moving in the L direction to be kept in a lock state.

Next described is the unlocking operation with insertion of the optical card. In FIG. 3, the optical card is first inserted through the slot 4 in the B direction toward the shuttle 3 in the apparatus body. Then, when the optical card 1 comes between the card guides 7 and 8, it comes into contact with the pin 9 fixed on the actuating lever 10. As the optical card 1 further moves, an urging force thereby rotates the actuating lever 10 about the lever shaft 11 in the F direction. At this moment, the pin 12 fixed on the actuating lever 10 works to move the lock plate 5 in the D direction along the guide pins 14 and 15, so that the spring click 16 comes to be coupled with another groove in the actuating lever 10. This locks the lock plate 5. Since the distal end 5a of the lock plate 5 leaves the groove 2a of optical head 2 on this occasion, the optical head 2 is freed so as to be movable in the J direction and released from the lock state. After the optical card 1 passed by the pin 9 fixed on the actuating lever 10, the actuating lever 10 rotates by the biasing force of the tension coil spring 17 in the E direction to return to the initial position.

Figure 4:
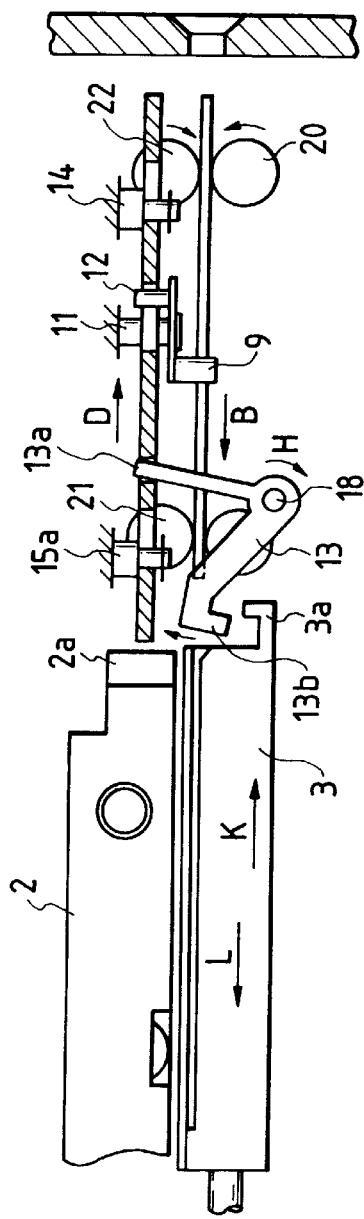
FIG. 4 is a cross section along A—A line in FIG. 3.

Meanwhile, in FIG. 4, when the lock plate 5 moves in the D direction, the lock lever 13 rotates about the lever shaft 18 in the H direction, because the arm 13a is set in the square hole in the lock plate 5. This rotation causes the lock portion 13b of lock lever 13 to leave the groove 3a of shuttle 3, whereby the shuttle 3 is freed so as to be movable in the L direction as released from the lock state.

Figure 6:
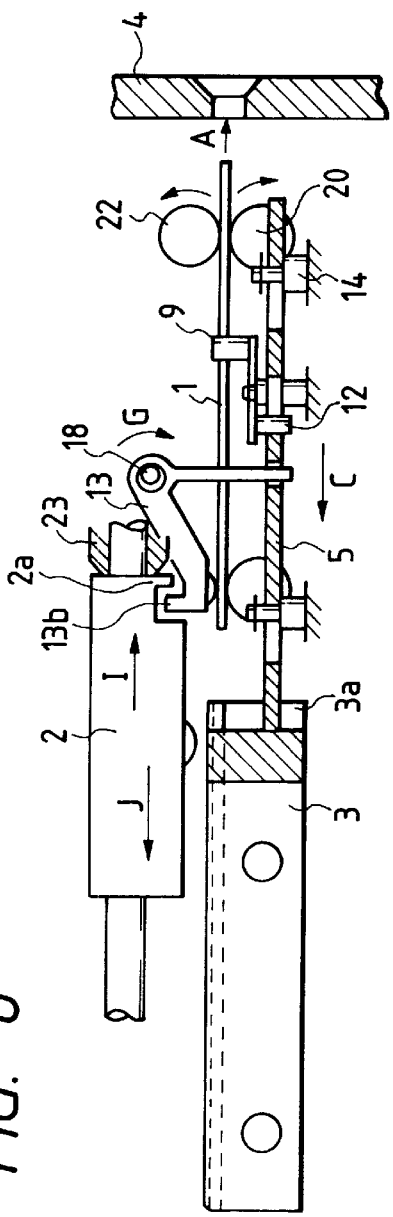
FIG. 6 is a front view of major part of the modification.

FIG. 5 and FIG. 6 show a modification of the first embodiment, which show a state in which the optical head 2 is locked. The above embodiment was so arranged that the shuttle 3 moved in the longitudinal direction of the optical card 1 and the optical head 2 in the transverse direction of the optical card 1, while the present modification is so arranged that the shuttle 3 moves in the transverse direction of the optical card 1 and the optical head 2 in the longitudinal direction of the optical card 1. Constituents and operations thereof are the same as those in the first embodiment. Therefore, same constituents are denoted by the same reference numerals and omitted from explanation herein.

Second Embodiment

Figure 8:
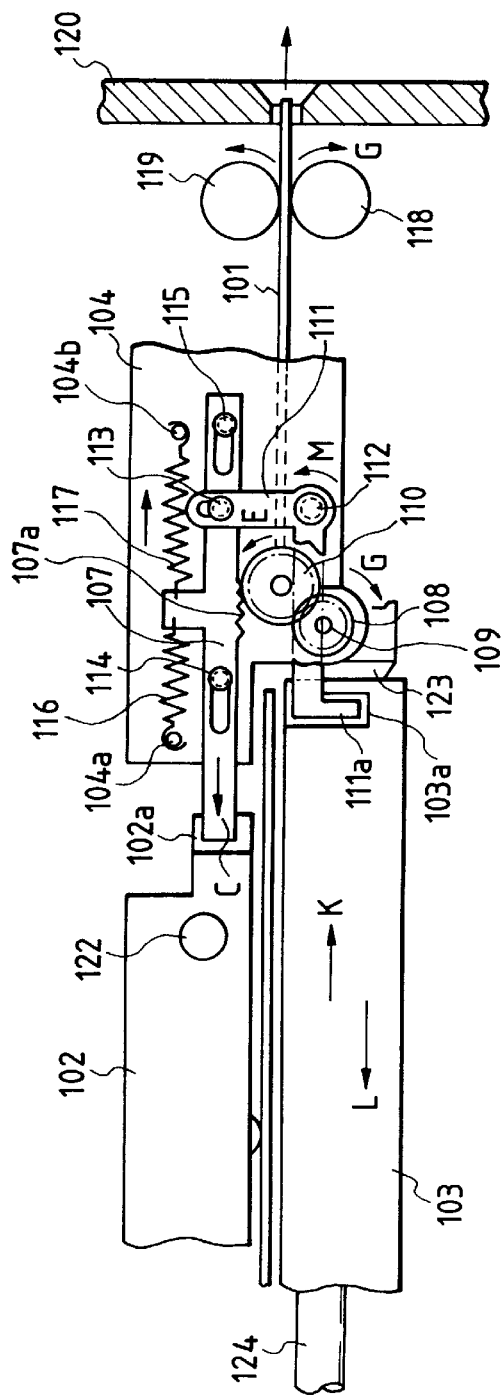
FIG. 8 is a front view of FIG. 7.
Figure 7:
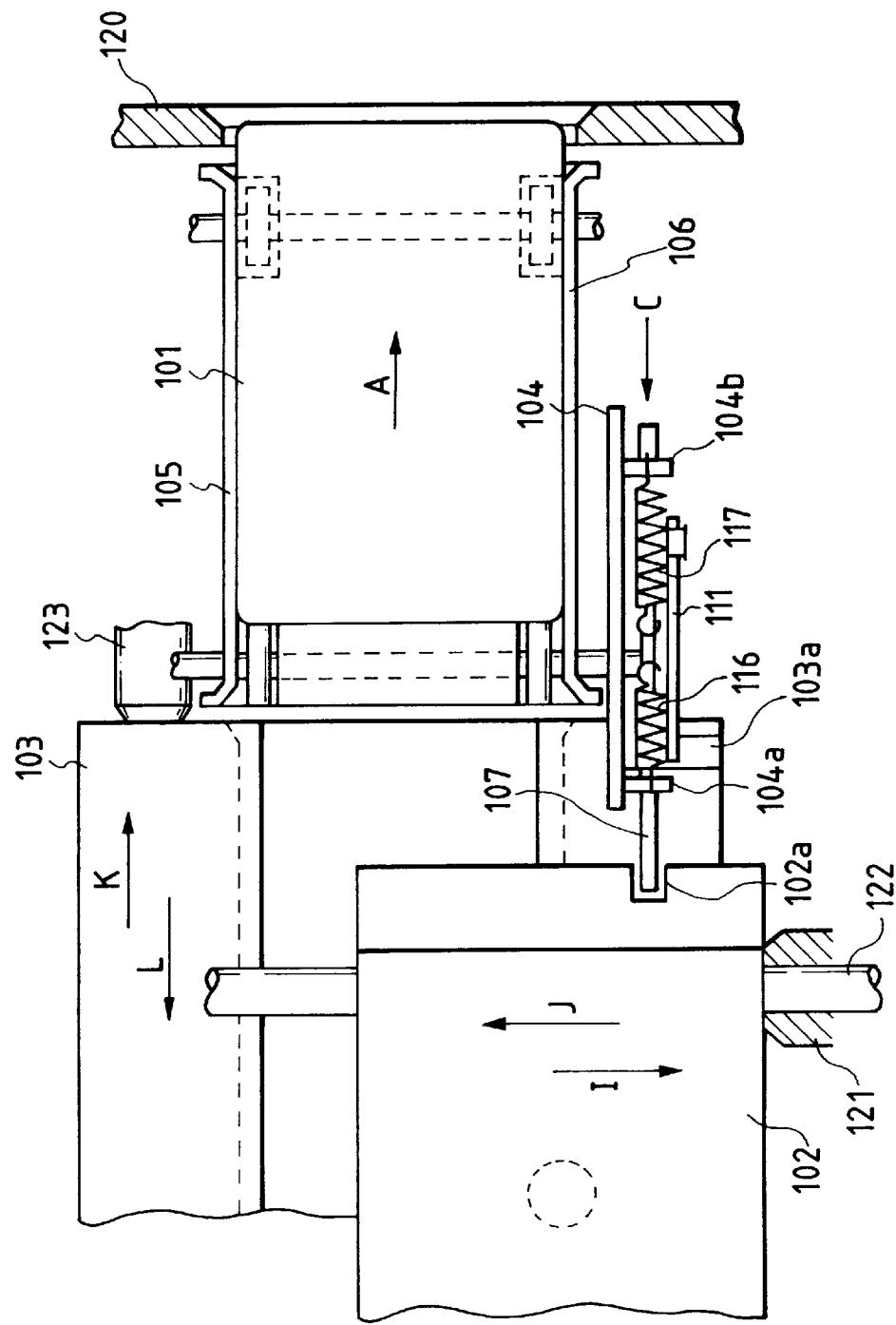
FIG. 7 is a plan view of major part to show the structure of the second embodiment of the present invention.
Figure 9:
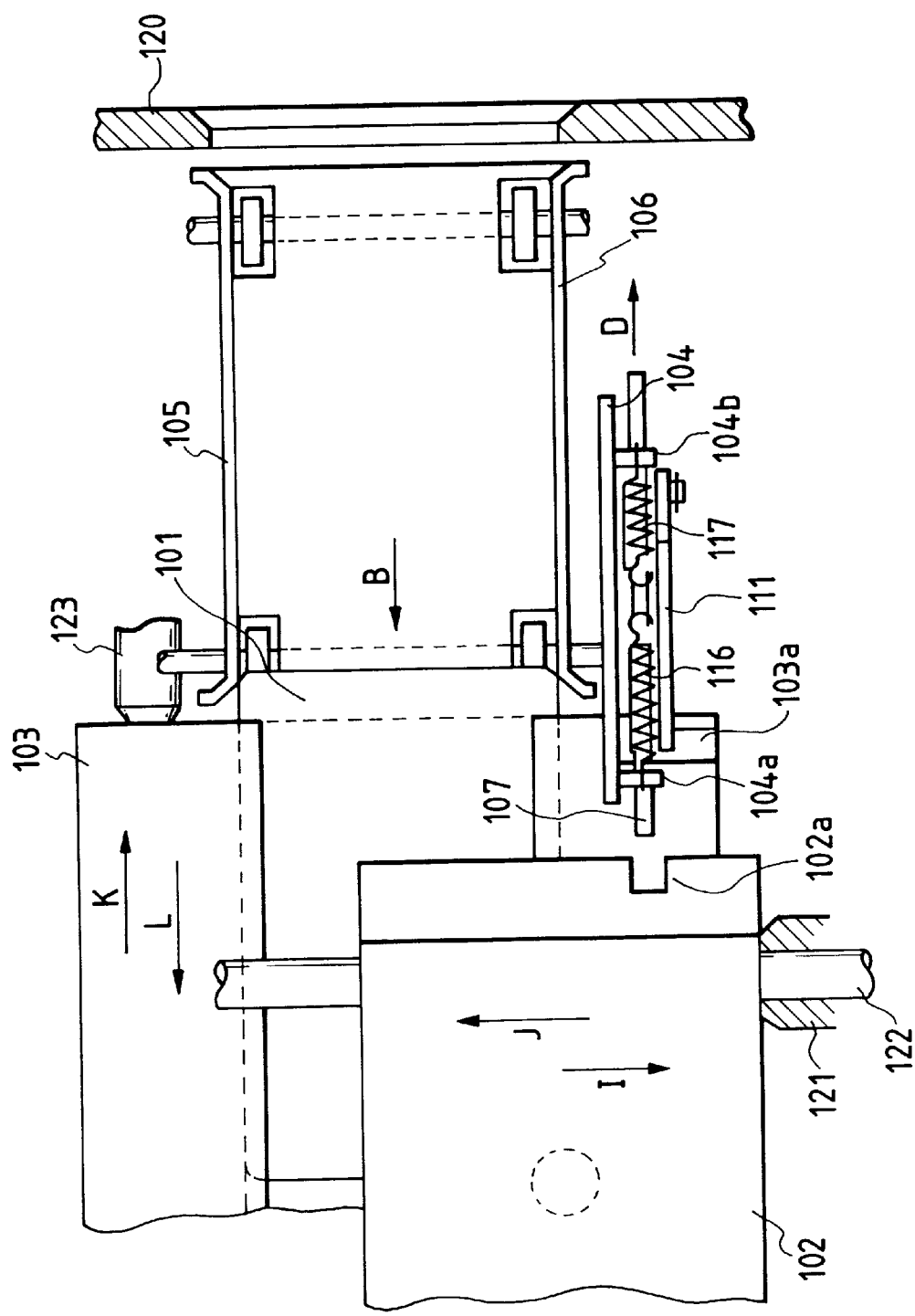
FIG. 9 is a plan view to show an operating state of the second embodiment.
Figure 10:
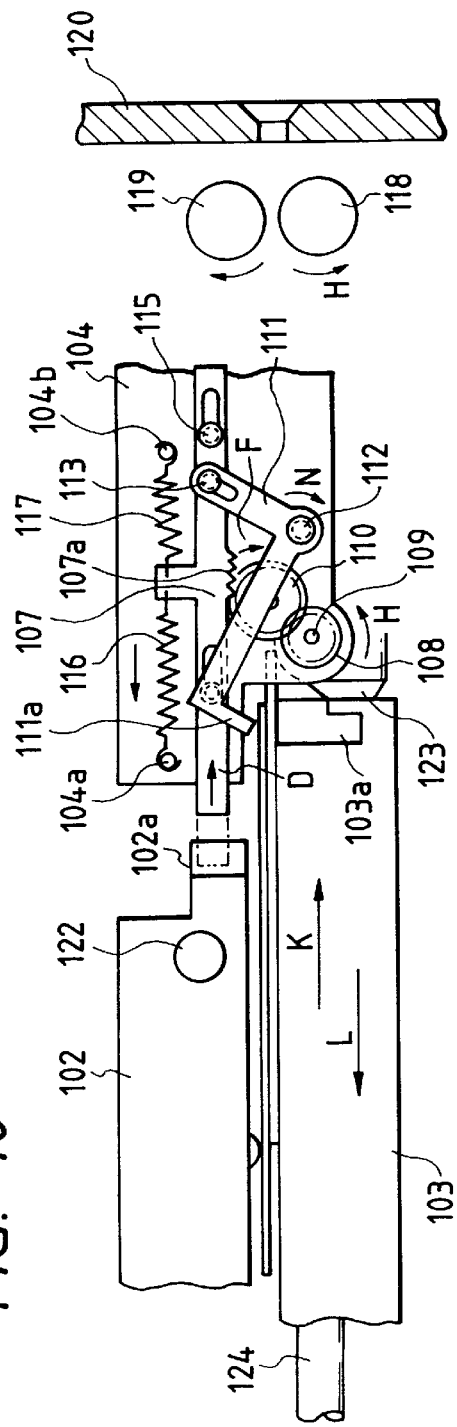
FIG. 10 is a front view of FIG. 9.

The second embodiment of the present invention will be described in detail with reference to FIG. 7 to FIG. 12. FIG. 7 and FIG. 8 show a state in which the optical card is discharged from the shuttle and the optical head and the shuttle are locked. Also, FIG. 9 and FIG. 10 show a state in which the optical card is inserted through the slot and the optical head and the shuttle are unlocked.

In FIG. 7 and FIG. 8, reference numeral 101 designates an optical card, 102 an optical head, 103 a shuttle on which the optical card is to be mounted, 104 a lock base, 121 a head stopper, 122 a head guide shaft, 123 a shuttle stopper, and 124 a shuttle guide shaft. The optical head 102 can move in the I direction and in the J direction along the head guide shaft 122. Also, a lock position of the optical head 102 is where the optical head 102 comes into contact with the head stopper 121. Also, the shuttle 103 can move in the K direction and in the L direction along the shuttle guide shaft 124. A lock position of the shuttle 103 is where the shuttle 103 comes into contact with the shuttle stopper 123.

Further, numeral 107 denotes a lock plate. The lock plate 107 has two elongate holes, with which guide pins 114 and 115 fixed on the lock base 104 are engaged. Also, the lock plate 107 is so arranged as to be able to slide in the longitudinal direction of the elongate holes with respect to the guide pins 114 and 115. Numerals 116, 117 denote tension coil springs, which are hooked on the lock plate 107 at one end and on a hook pin 104a, 104b fixed on the lock base 104 at the other end.

Numeral 111 denotes a lock lever. A pin 113 fixed on the lock plate 107 is engaged with an elongate hole in the lock lever 111 so that it is pivotable about the lever shaft 112 in synchronism with a motion of the lock plate 107. Numerals 108 and 118 are drive rollers for feeding the optical card. A gear 109 is set on the same shaft as the drive roller 108 and meshes with a gear 110. The gear 110 also meshes with a rack portion 107a of the lock plate 107.

In the apparatus as so arranged, first described is a locking operation with discharge of the optical card. In FIG. 7 and FIG. 8, the optical head 102 movable in the I and J directions moves in the I direction and stops when it comes into contact with the head stopper 121. This position is a lock position of the head. Also, the shuttle 103 movable in the K and L directions moves in the K direction and stops when it comes into contact with the shuttle stopper 123. This position is a lock position of the shuttle.

Then, the optical card 101 mounted on the shuttle 103 is discharged from the shuttle 103 and at the same time a drive source for conveying the card is actuated to rotate the drive rollers 108, 118 in the G direction. The optical card 101 is conveyed by the drive rollers 108, 118 along the card guides 105, 106 in the A direction toward the slot 120. On this occasion, the gear 109 set on the same shaft as the drive roller 108 rotates in the same G direction as the drive roller 108 so as to rotate the gear 110 in the E direction. When the gear 110 comes to mesh with the rack portion 107a of the lock plate 107, the lock plate 107 starts sliding in the C direction. When the gear 110 comes to a position where the rack portion 107a ends, the meshing between the rack portion 107a and the gear 110 is released. Then, the gear 110 idles and the lock plate 107 stops. At this moment, the left end of the lock plate 107 enters a groove 102a of optical head 102, whereby the optical head 102 is stopped from moving in the J direction as kept in a lock state.

When the lock plate 107 slides in the C direction, the pin 113 fixed on the lock plate 107 simultaneously works to rotate the lock lever 111 in the M direction about the lever shaft 112, so that the distal end 111a of the lock lever 111 enters a groove 103a of the shuttle 103. This stops a motion of the shuttle 103 in the L direction as keeping it in a lock state. In this lock state, the lock plate 107 is subject to the biasing force in the direction opposite to the C direction due to the action of the tension coil springs 116, 117. Accordingly, when the gear 110 starts rotating in the F direction opposite to the direction upon locking, the rack portion 107a is ready to come to mesh with the gear 110.

Next described is the unlocking operation with insertion of the optical card. In FIG. 9 and FIG. 10, the optical card 101 is first inserted through the slot 120 in the B direction toward the shuttle 103 in the apparatus body. When the optical card 101 is inserted, a sensor (not shown) in the apparatus body detects it at the same time. Then, the sensor actuates the drive source for conveying the card to rotate the drive rollers 108 and 118 in the H direction. On this occasion, the gear 109 arranged on the same shaft as the drive roller 108 also rotates in the same H direction as the drive roller 108. At the same time, the gear 110 meshing with the gear 109 rotates in the F direction. Then, the rack portion 107a comes to mesh with the gear 109 to slide the lock plate 107 in the D direction up to a position where the rack portion 107a ends. At this moment, the left end of lock plate 107 leaves the groove 102a of optical head 102, so that the optical head 102 is freed from the restriction on movement in the J direction as released from the lock state.

On the other hand, as the lock plate 107 is sliding in the D direction, the pin 113 fixed on the lock plate 107 simultaneously works to rotate the lock lever 111 in the N direction about the lever shaft 112. Then, the distal end 111a of the lock lever 111 leaves the groove 103a of shuttle 103, whereby the shuttle 103 is freed from the restriction on movement in the L direction as released from the lock state.

The present embodiment has the arrangement as described above to automatically lock or unlock the optical head 102 and the shuttle 103 in synchronism with discharge or insertion of card, using the same drive source as in loading the optical card.

Figure 12:
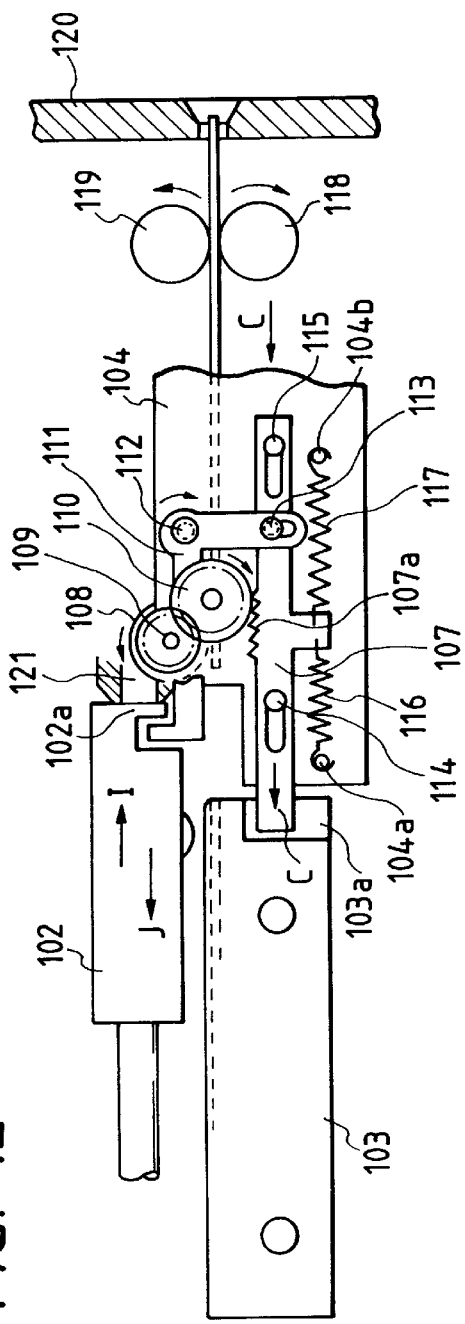
FIG. 12 is a front view of FIG. 11.
Figure 11:
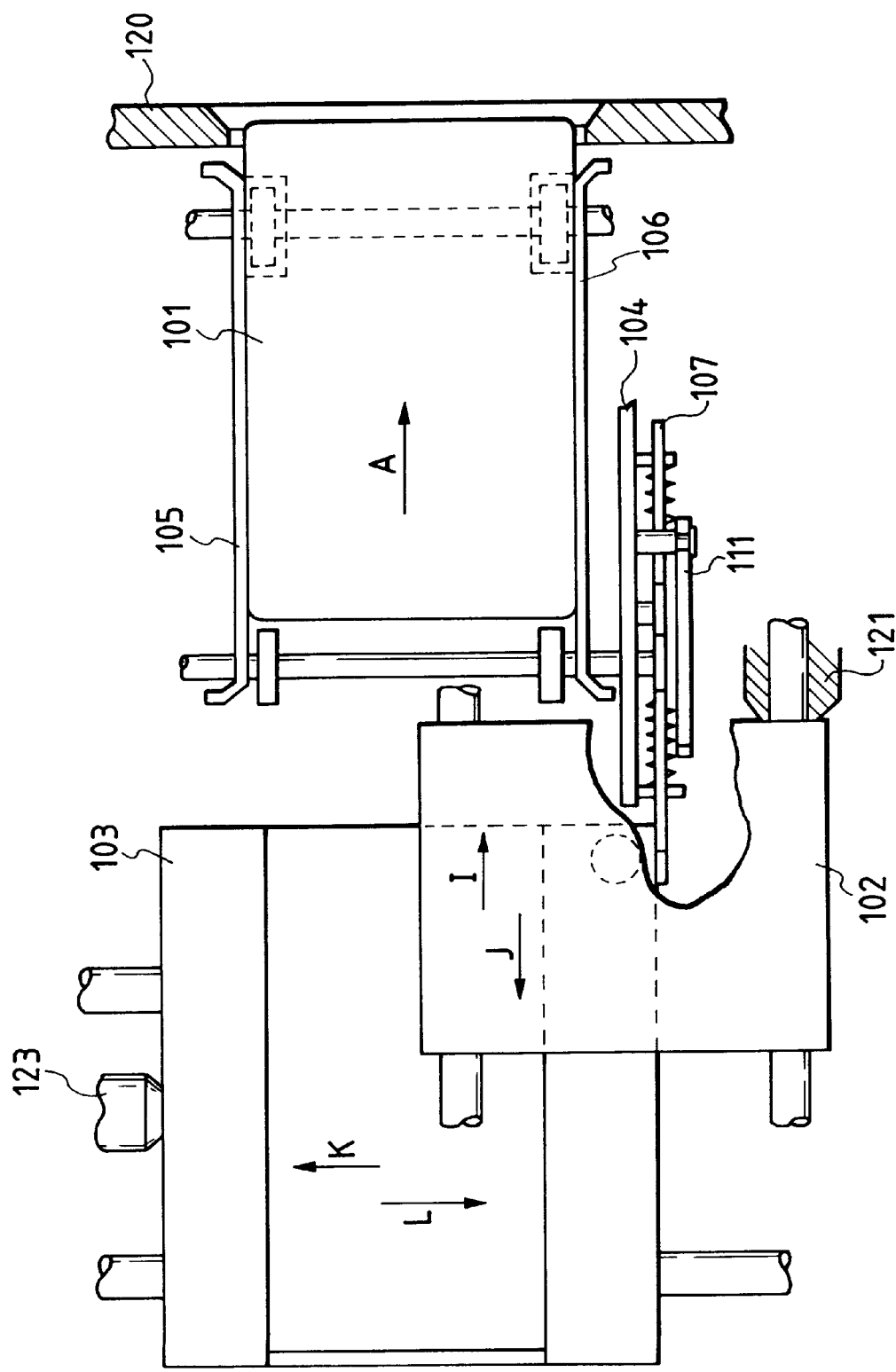
FIG. 11 is a plan view of major part to show a modification of the second embodiment.

FIG. 11 and FIG. 12 show a modification of the above-described embodiment, which show a state in which the optical head 102 and the shuttle 103 are locked. The second embodiment was so arranged that the shuttle 103 was moved in the longitudinal direction of the optical card 101 and the optical head 102 in the transverse direction of the optical card 101, while the present modification is so arranged that the shuttle 103 is moved in the transverse direction of the optical card 101 and the optical head 102 in the longitudinal direction of the optical card 101. Since the arrangement and operations of constituents are the same as those in the second embodiment, they are denoted by the same reference numerals and omitted from explanation herein.

Third Embodiment

Figure 14:
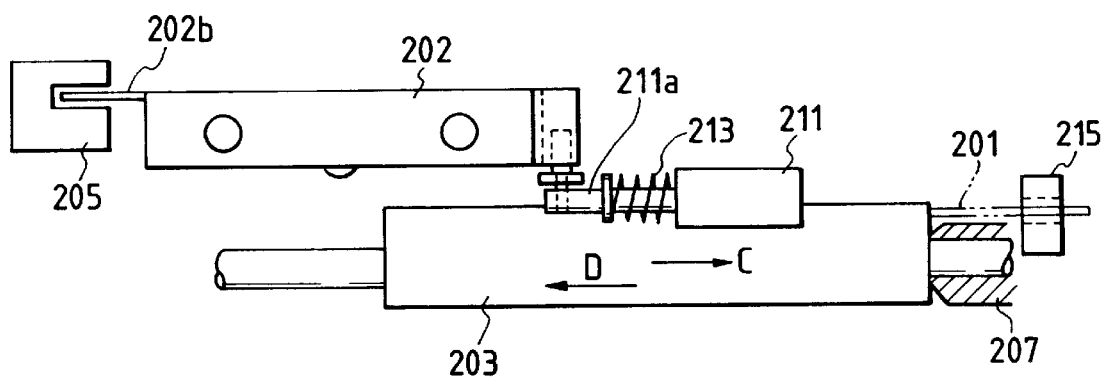
FIG. 14 is a front view of FIG. 13.
Figure 15:
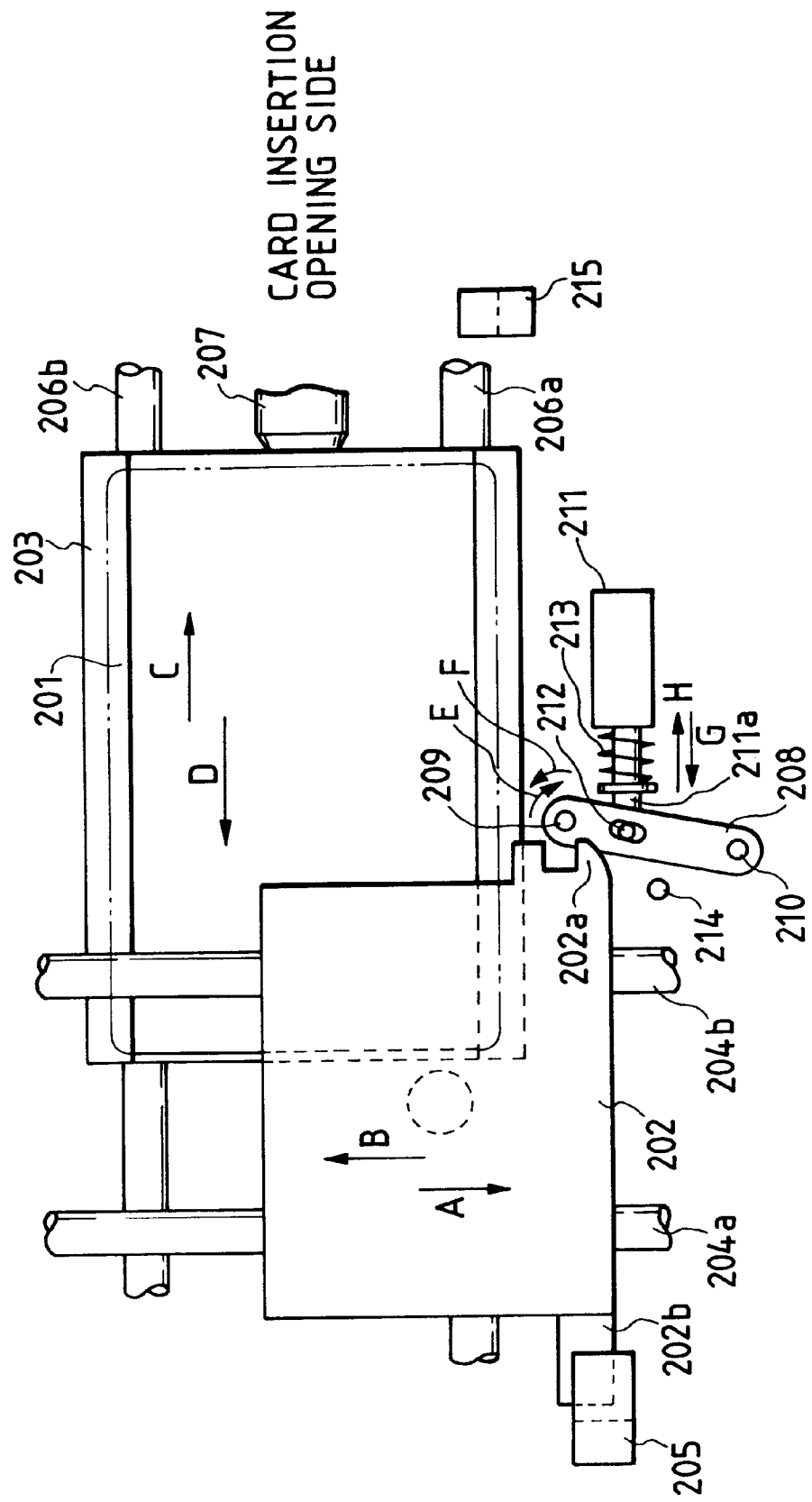
FIG. 15 is a plan view to show an operating state of the third embodiment.

The third embodiment of the present invention is next described in the concrete with reference to FIG. 13 to FIG. 17C. FIG. 13 and FIG. 14 show the structure of the third embodiment in a lock state of optical head. FIG. 15 shows an unlocked state of optical head, FIG. 16 the position of an ejection button provided in the apparatus body, and FIGS. 17A, 17B and 17C flowcharts for locking operation and unlocking operation of the optical head.

In FIG. 13, numeral 201 designates an optical card, 202 an optical head for irradiating an optical beam, 202a a lock member formed on the optical head 202, 202b a sensor plate, 204a, 204b head guide shafts for guiding the optical head 202, and 205 a head lock sensor. The optical head 202 is arranged to move in the A direction and in the B direction along the head guide shafts 204a, 204b. With the motion, the head lock sensor 205 is activated by the sensor plate 202b set on the optical head 202. Based on a detection signal from the sensor 205, a CPU generates a command to stop the optical head 202. This position is a lock position of the optical head 202.

Also, numeral 203 is a shuttle on which the optical card 201 is to be mounted, 206a, 206b shuttle guide shafts for guiding the shuttle 203, and 207 a shuttle stopper. The shuttle 203 is arranged to move in the C direction and in the D direction along the shuttle guide shafts 206a, 206b. A card insertion and discharge position of the shuttle 203 is where the shuttle 203 comes into contact with the shuttle stopper 207. A card slot is provided on the right side in the drawings with respect to the shuttle 203.

Numeral 208 designates a lock lever, 209 a lock pin, and 210 a lever pin. The lock pin 209 is fixed on the lock lever 208 and the lock lever 208 is pivotable about the lever pin 210. Also, numeral 211 denotes a solenoid, which is fixed on the apparatus body. Numeral 211a denotes a solenoid iron core and 212 a solenoid pin, which is fixed on the end portion of the solenoid iron core 211a as engaging with an elongate hole in the lock lever 208. Numeral 213 is a solenoid return spring, which is set around the solenoid iron core 211a to return the solenoid iron core 211a to the original state when the power to the solenoid 211 is cut. Also, numeral 214 is a stopper pin, which stops the pivotal movement of the lock lever 208 when it comes into contact with the edge face of lock lever 208. Further, numeral 215 denotes a card sensor, which detects passage of the optical card 201.

Figure 16:
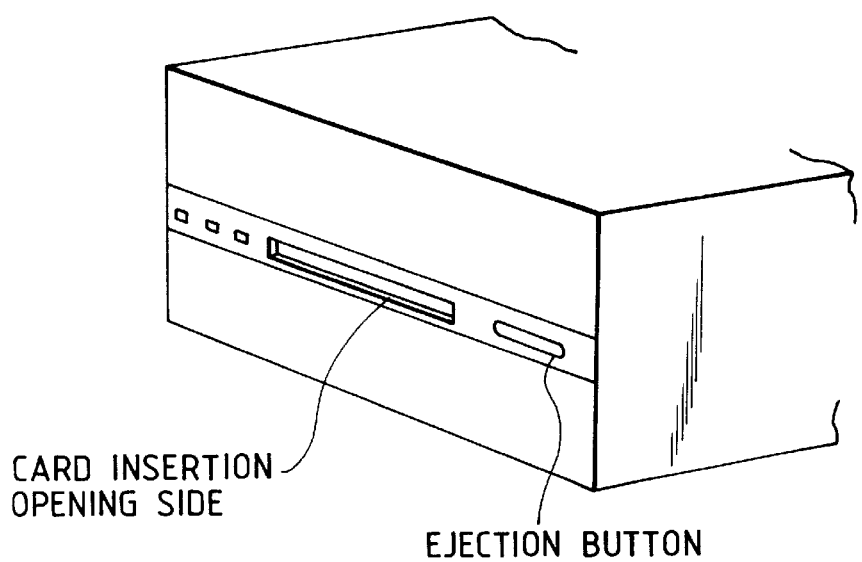
FIG. 16 is a drawing to show the position of an ejection button in an apparatus body.

A locking operation of the optical head 202 is next described in order in the above arrangement. First, when an operator presses the ejection button as shown in FIG. 16, the CPU detects a signal from the ejection button. Then, the CPU supplies a command to move the shuttle 203 in the C direction from the recording/reproducing position in FIG. 13 and to stop it when coming into contact with the shuttle stopper 207. This position is the card insertion and discharge position of the shuttle 203. The shuttle 203 is mechanically locked (not shown) at this position. In case the optical card 201 is inside the apparatus body, the card is discharged through the card slot. At the same time, the optical head 202 moves in the A direction, so that the lock member 202a formed on the optical head 202 applies an urging force on the lock pin 209 to lift it up and to rotate the lock lever 208 in the E direction.

When the optical head 202 further moves so as to bring the lock pin 209 into a groove of the lock member 202a, the biasing force of the solenoid return spring 213 pushes the solenoid iron core 211a in the G direction to rotate the lock lever 208 in the F direction. When the lock pin 209 enters the groove of lock member 202a, the optical head 202 is stopped from moving in the A and B directions to be kept in a lock state. At the same time, the head lock sensor 205 detects the sensor plate 202b at this position and turns off the drive power source for the optical head 202 through the CPU. This flow is given in FIG. 17A.

Figure 17A:
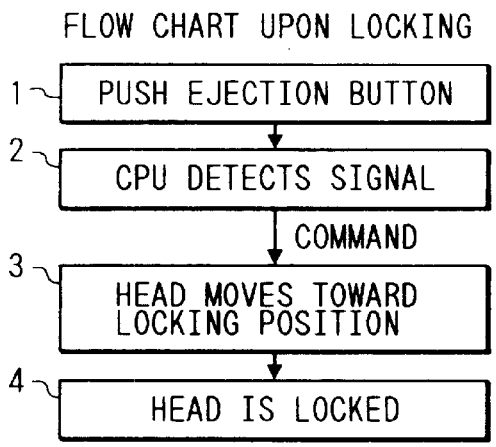
FIGS. 17A, 17B and 17C are flowcharts for locking operation in the third embodiment.
Figure 17B:
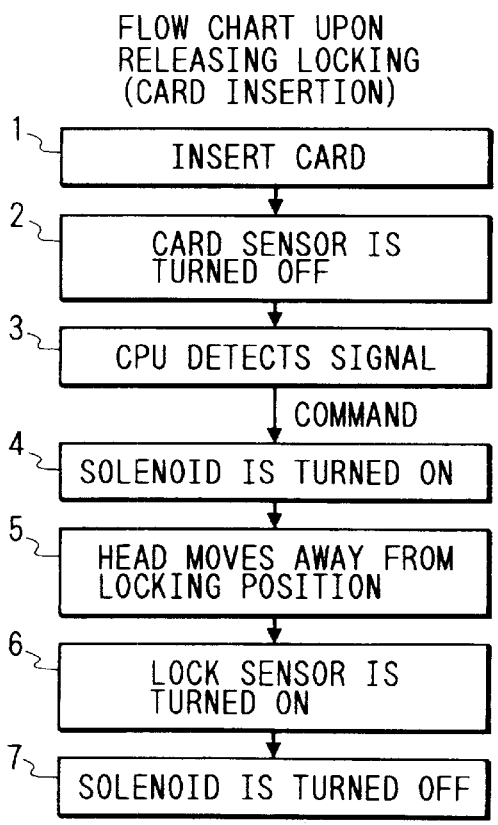

Next described is an unlocking operation of the optical head 202. In FIG. 15, when the optical card 201 is inserted into the apparatus body to pass by the detection position of the card sensor 215, the card sensor 215 is turned off. The CPU detects a signal from the sensor to turn on the solenoid 211. This causes the solenoid iron core 211a to be drawn in the H direction, whereby the lock lever 208 is rotated in the E direction and the optical head 202 is unlocked. While the solenoid 211 is kept on, the optical head 202 moves in the B direction by a command from the CPU to turn on the head lock sensor. This turns off the solenoid 211, so that the solenoid iron core 211a is pushed by the solenoid return spring 213 in the G direction to rotate the lock lever 208 in the F direction. The lock lever 208 stops when it comes into contact with the stopper 214, ending the process of unlocking operation. FIG. 17B is a flowchart to show the unlocking operation with insertion of the card as described above.

Figure 17C:
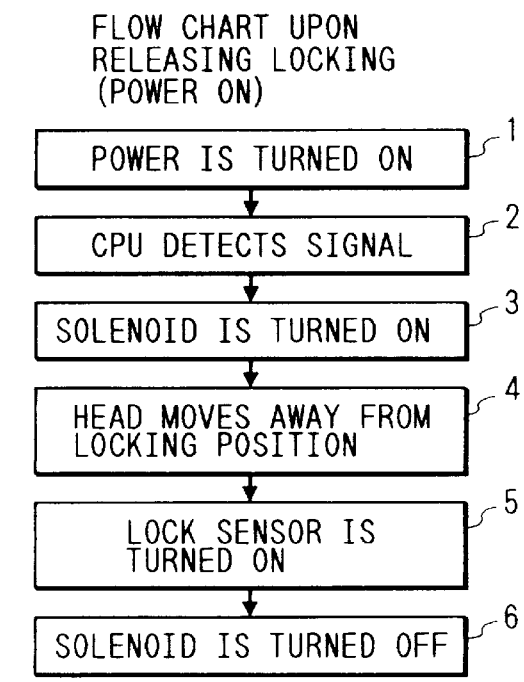

The means for unlocking the optical head 202 may be modified such that the CPU detects the signal of turning-on of the power and then turns on the solenoid 211 thereby. FIG. 17C is a flowchart to show the unlocking operation employing the method of detecting the signal of "power on".

Figure 18:
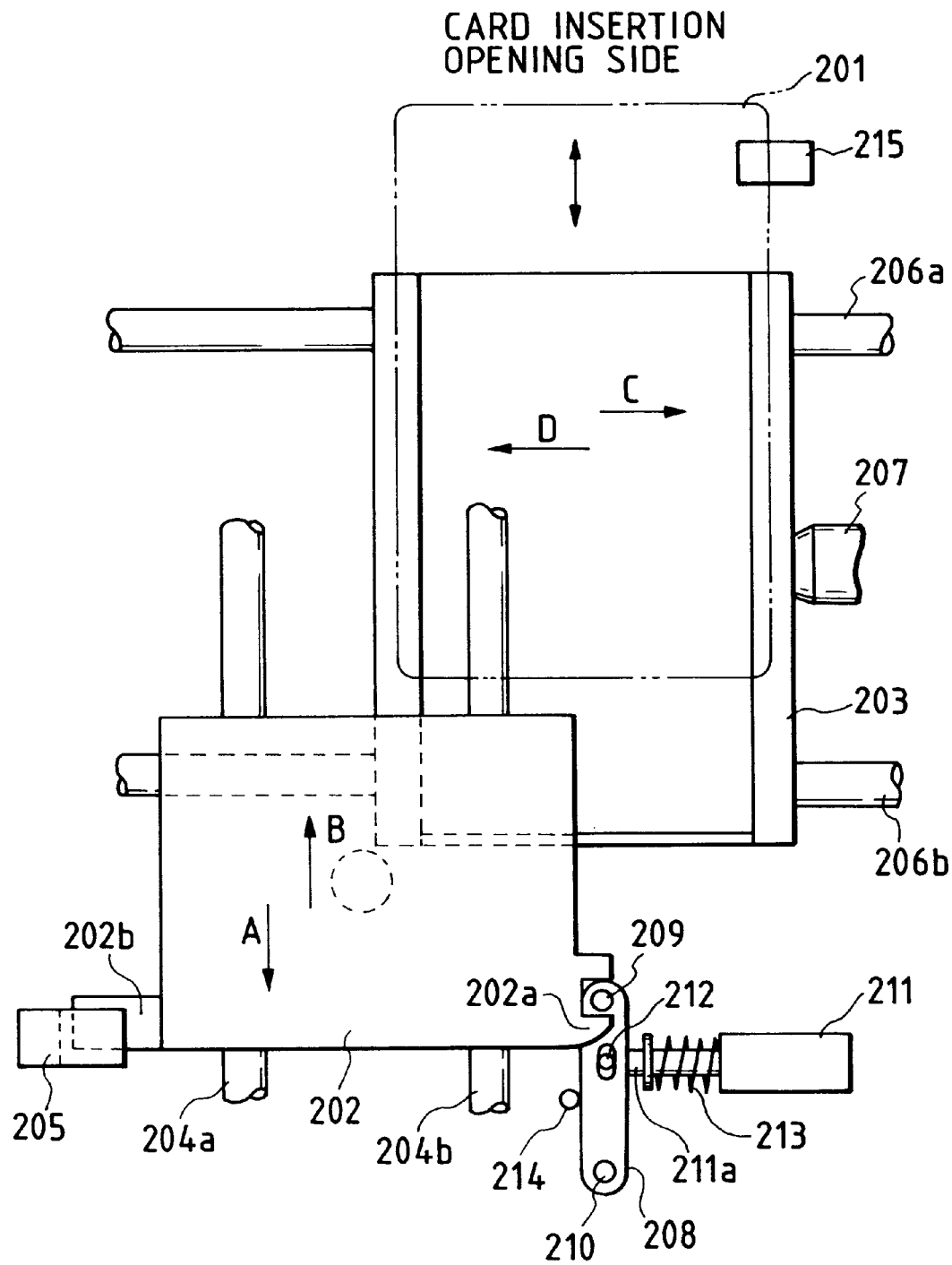
FIG. 18 is a plan view of major part to show a modification of the third embodiment.

FIG. 18 shows a modification of the third embodiment, which shows a state in which the optical head 202 is locked. The third embodiment was so arranged that the shuttle 203 moved in the longitudinal direction of the optical card 201 and the optical head 202 in the transverse direction of the optical card 201, while the present modification is so arranged that the shuttle 203 moves in the transverse direction of the optical card 201 and the optical head 202 in the longitudinal direction of the optical card 201. Since constituents and operations thereof are the same as those in the third embodiment, they are omitted from explanation herein.

Fourth Embodiment

Figure 19:
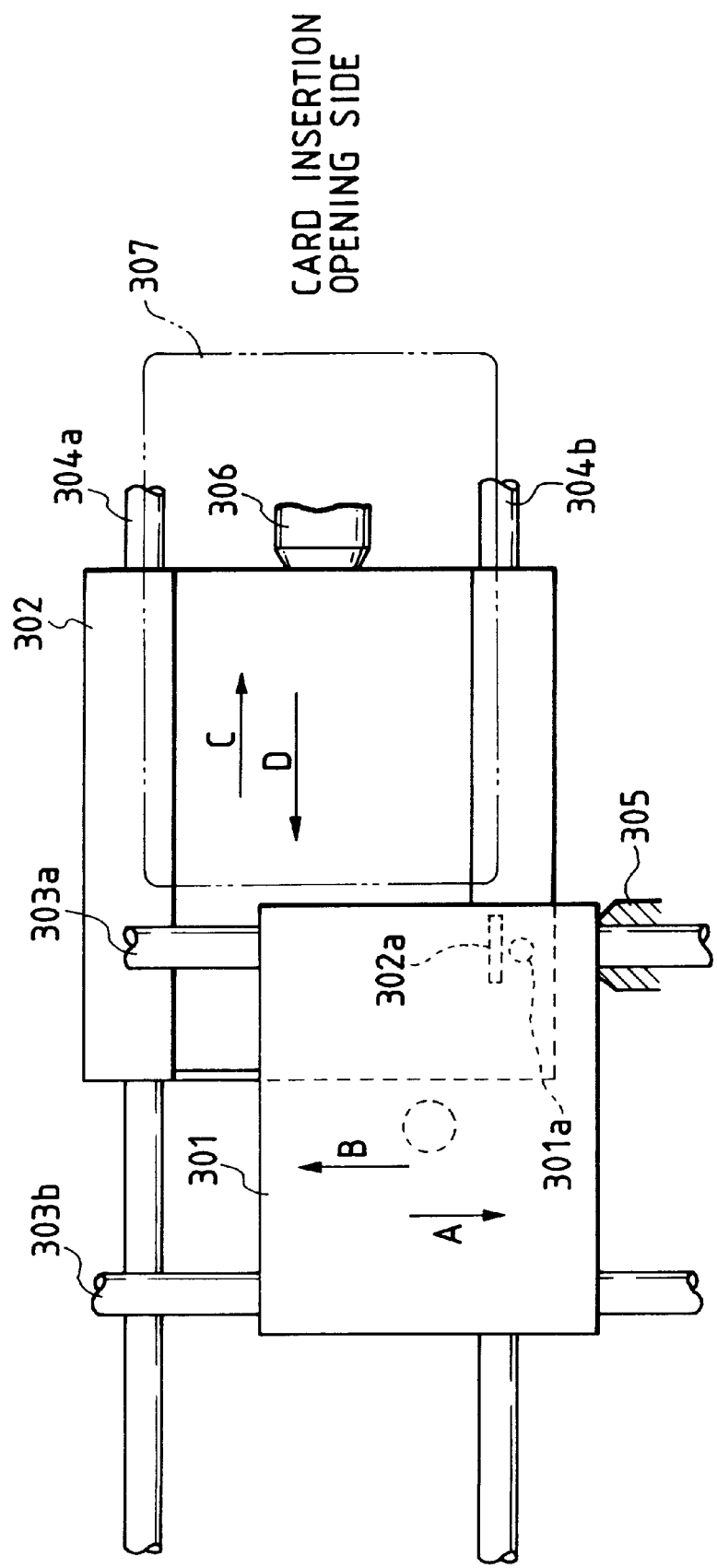
FIG. 19 is a plan view to show the fourth embodiment of the present invention.
Figure 20:
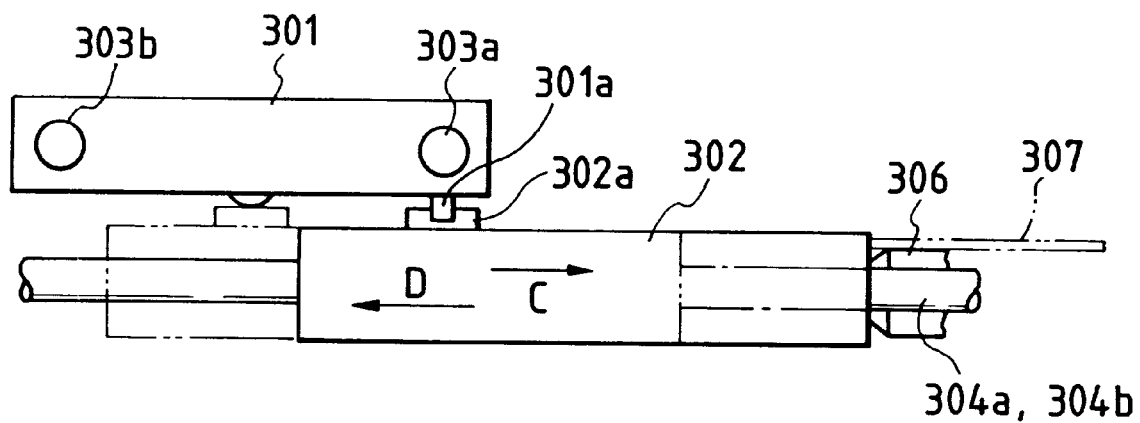
FIG. 20 is a front view of FIG. 19.
Figure 21:
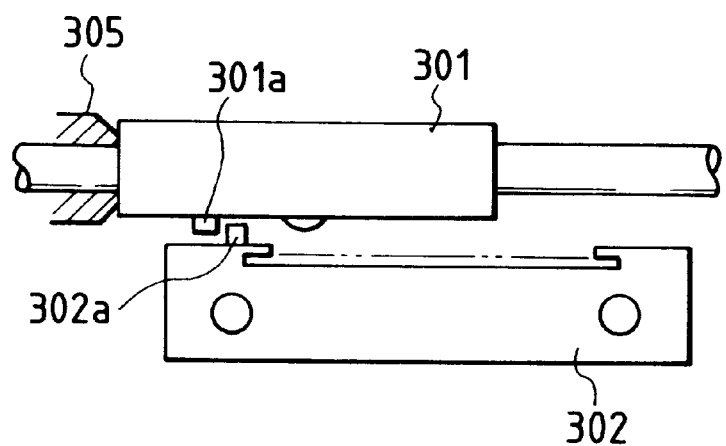
FIG. 21 is a right side view of FIG. 19.

FIG. 19 to FIG. 21 show the fourth embodiment of the present invention. Numeral 301 denotes an optical head for irradiating an optical beam onto an optical card 307, 301a a first lock member formed on the optical head 301, 303a, 303b head guide shafts for guiding the optical head 301, and 305 a head stopper. The optical head 301 is arranged as movable in the A and B directions along the head guide shafts 303a, 303b. A lock position of the optical head is where the optical head 301 comes into contact with the head stopper 305.

Also, numeral 302 designates a shuttle on which the optical card 307 is to be mounted, 302a a first lock member formed on the shuttle 302, 304a, 304b shuttle guide shafts for guiding the shuttle 302, and 306 a shuttle stopper. The shuttle 302 is arranged as movable in the C and D directions along the shuttle guide shafts 304a, 304b. A card insertion and discharge position of the shuttle 302 is where the shuttle 302 comes into contact with the shuttle stopper 306. The drive for the optical head 301 and the shuttle 302 is a linear motor (not shown) in the present embodiment, for example. However, the type of motor is not limited in the present invention.

Next described is the locking operation of the optical head 301 in the above arrangement. For locking the head, the optical head 301 first moves in the A direction and stops when it comes into contact with the head stopper 305. This position is the lock position of the head. Then, the shuttle 302 moves in the C direction and stops when it comes into contact with the shuttle stopper 306. This position is the card insertion and discharge position of the shuttle. The shuttle is mechanically locked (not shown) at this position. At this moment, the first lock member 301a is associated with the second lock member 302a, whereby the optical head 301 is stopped from moving in the B direction and kept in a lock state.

Next described is the unlocking operation of the head. First, when the optical card 301 is inserted through the slot (not shown), the optical card 307 is conveyed by loading rollers (not shown) to be mounted on the shuttle 302 in the apparatus body. Then, the shuttle 302 is released by solenoid drive from the mechanical lock (not shown) and then moves from the card insertion and discharge position in the D direction. Thus, the second lock member 302a leaves the first lock member 301a. As a result, the optical head 301 is freed so as to move from the lock position in the B direction and released from the lock state.

Figure 22:
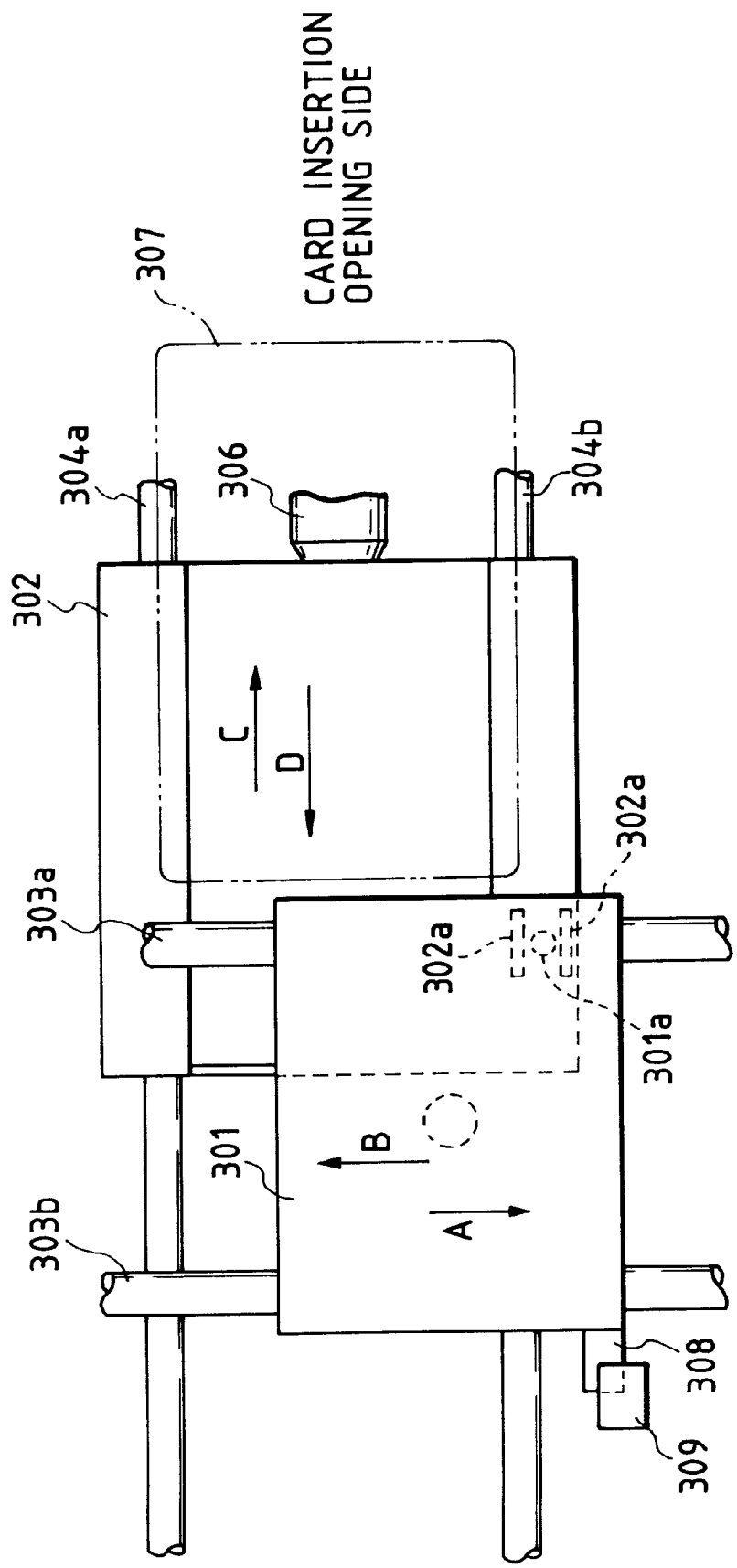
FIG. 22 is a plan view to show a modification of the fourth embodiment.
Figure 23:
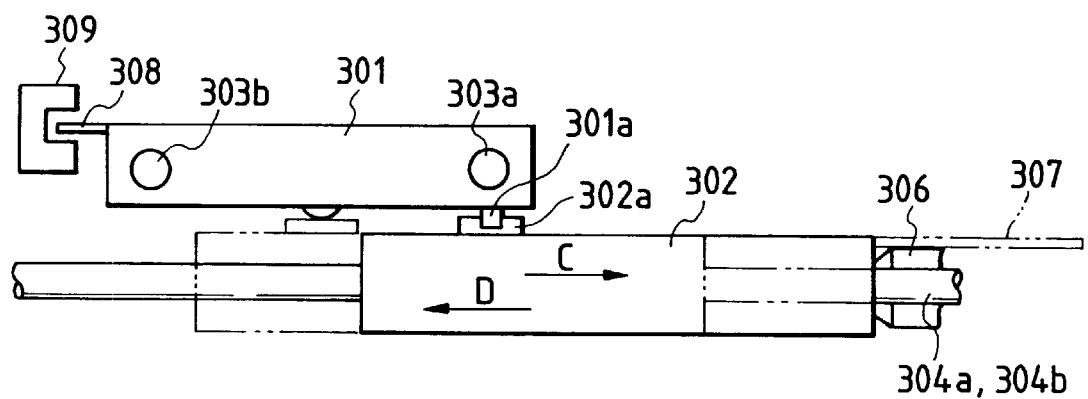
FIG. 23 is a front view of FIG. 22.
Figure 24:
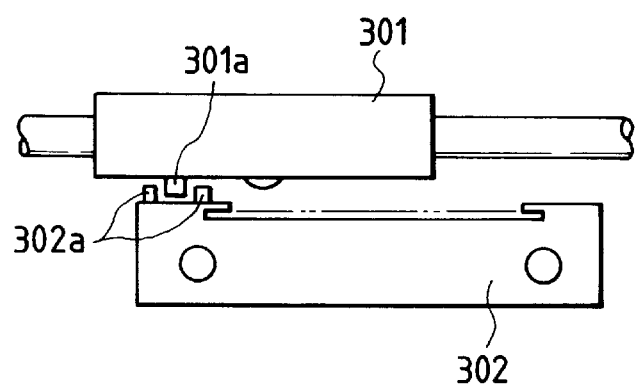
FIG. 24 is a right side view of FIG. 22.

FIG. 22 to FIG. 24 show a modification of the fourth embodiment, which show a state in which the optical head 301 is locked. The fourth embodiment was so arranged that the head lock position was where the optical head 301 came into contact with the head stopper 305, while the present modification is so arranged that the head lock position is detected by a sensor plate 308 set on the optical head 301 and a head lock sensor 309 to stop the optical head 301.

Figure 25:
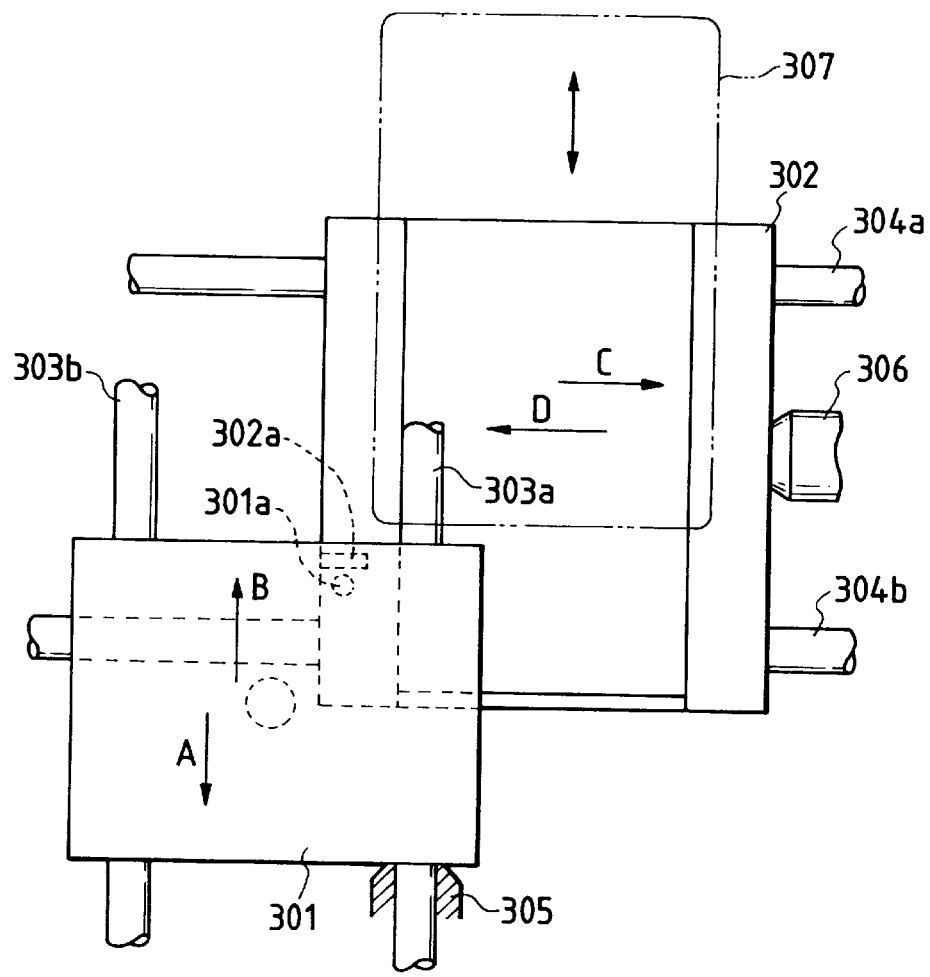
FIG. 25 is a plan view to show another modification of the fourth embodiment.
Figure 26:
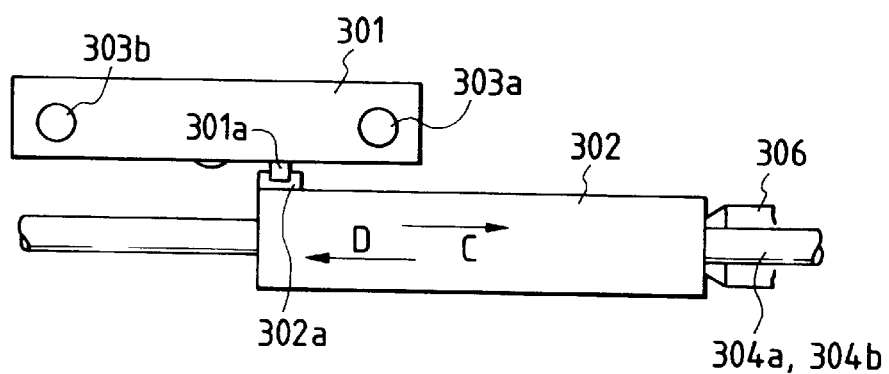
FIG. 26 is a front view of FIG. 25.

Further, FIG. 25 and FIG. 26 show another modification, which show a state in which the optical head 301 is locked. The fourth embodiment was so arranged that the shuttle 302 moved in the longitudinal direction of the optical card 307 and the optical head 301 in the transverse direction of the optical card 307, while the present modification is so arranged that the shuttle 302 moves in the transverse direction of the optical card 307 and the optical head 301 in the longitudinal direction of the optical card 307. Since constituents and operations thereof are the same as those in the fourth embodiment, they are denoted by the same reference numerals and omitted from explanation herein.

Fifth Embodiment

Figure 27:
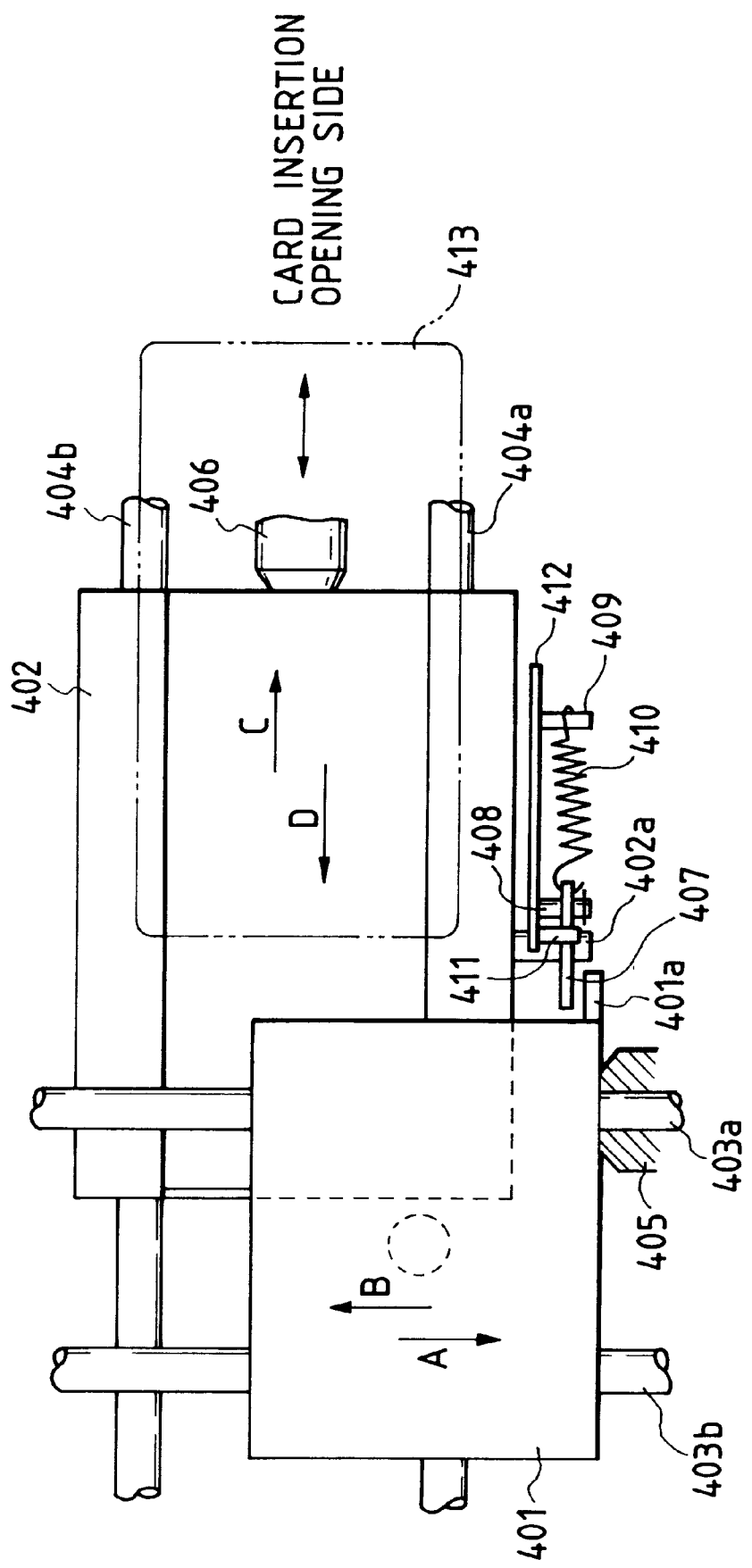
FIG. 27 is a plan view to show the fifth embodiment of the present invention.
Figure 28:
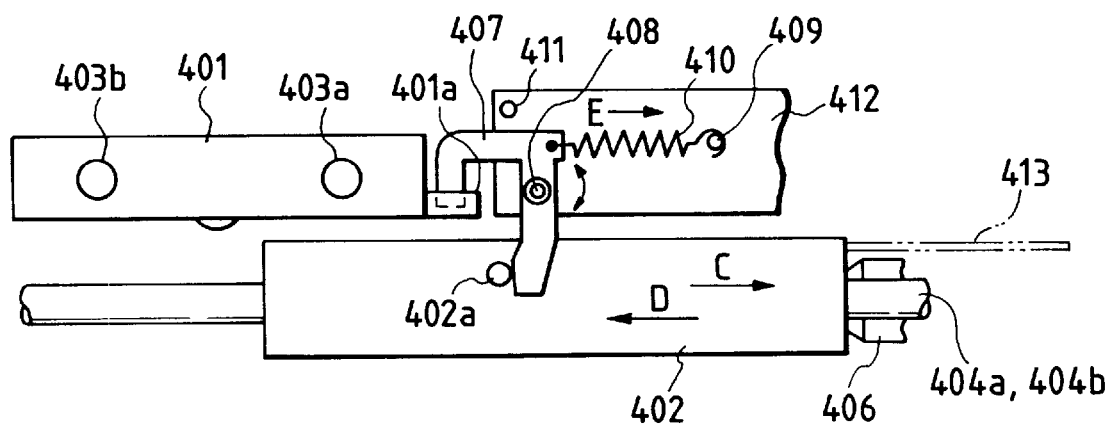
FIG. 28 is a front view of FIG. 27.
Figure 29:
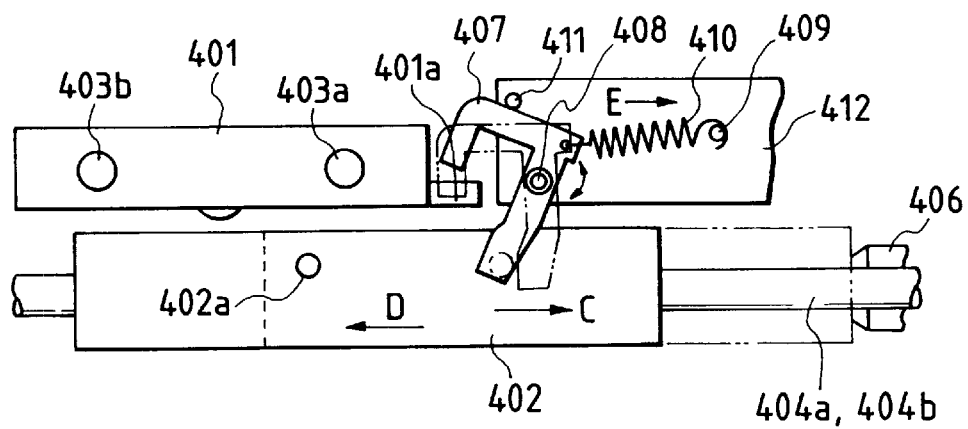
FIG. 29 is a front view to show an operating state of the fifth embodiment.

FIG. 27 to FIG. 29 show the fifth embodiment of the present invention. FIG. 27 and FIG. 28 show a state in which the optical head is locked, and FIG. 29 a state in which the optical head is unlocked. In the drawings, reference numeral 401 designates an optical head for irradiating an optical beam onto an optical card 413, 401*a* a lock member formed on the optical head 401, 403*a*, 403*b* head guide shafts for guiding the optical head 401, and 405 a head stopper. The optical head 401 is arranged to be movable in the A and B directions along the head guide shafts 403*a*, 403*b*. The head lock position of the optical head 401 is where the optical head 401 comes into contact with the head stopper 405.

Also, numeral 402 denotes a shuttle on which the optical card 413 is to be mounted, 402*a* a projecting member formed on the shuttle 402, 404*a*, 404*b* shuttle guide shafts for guiding the shuttle 402, and 406 a shuttle stopper. The shuttle 402 is arranged as movable in the C and D directions along the shuttle guide shafts 404*a*, 404*b*. The card insertion and discharge position of the shuttle is where the shuttle comes into contact with the shuttle stopper 406.

Further, numeral 407 denotes a lock lever, 408 a lock lever shaft, 409 a spring hook pin, and 410 a tension coil spring. The tension coil spring 410 is hooked on the lock lever 407 at one end and on the spring hook pin 409 at the other end. Also, numeral 411 is a stopper pin, and 412 a base plate. Fixed on the base plate 412 are the lock lever shaft 408, the spring hook pin 407 and the stopper pin 411 as described above. The lock lever 407 is arranged to be rotatable about the lock lever shaft 408. The lock lever 407 is subject to a pulling force in the E direction by the tension coil spring 410 so as to be urged in the E direction. The lock lever 407 is stopped from rotating at a position where it is in contact with the stopper pin 411.

The locking operation of the optical head 401 is described in the above arrangement. For locking the head, the optical head 401 first moves in the A direction and stops when it comes into contact with the head stopper 405. This position is the head lock position. At this moment, the lock lever 407 is still urged in the E direction under the pulling force by the tension coil spring 410 while stopping at the position where it is in contact with the stopper pin 411. FIG. 29 shows the state at this moment.

Then, the shuttle 402 moves in the C direction and stops when it comes into contact with the shuttle stopper 406. This position is the card insertion and discharge position of the shuttle. The shuttle 402 is mechanically locked (not shown) at this position. On this occasion, the projecting member 402*a* also moves in the C direction in synchronism with the motion of the shuttle 402. Then, the projecting member 402*a* comes into contact with an end of the lock lever 407 to rotate the lock lever 407 counterclockwise about the lock lever shaft 408. On this occasion, the other end of the lock lever 407 comes to engage with the lock member 401*a* to stop the optical head 401 from moving in the B direction, whereby the optical head 401 is kept in a lock state. The drive for the optical head 401 and the shuttle 402 is a linear motor (not shown), for example, but the type of motor is not limited to it.

In the unlocking operation, the shuttle 402 moves in the D direction from the position where it is in contact with the shuttle stopper 406, so that the projecting member 402*a* leaves the lock lever 407, whereby the lock lever 407 rotates clockwise about the lock lever shaft 408 by the pulling force of the tension coil spring 410, and stops when it comes into contact with the stopper pin 411. At that moment, the other end of the lock lever 407 also leaves the lock member 401*a*, which enables the optical head 401 to move from the head lock position as releasing the optical head from the lock state. FIG. 29 shows the state at this moment.

Figure 30:
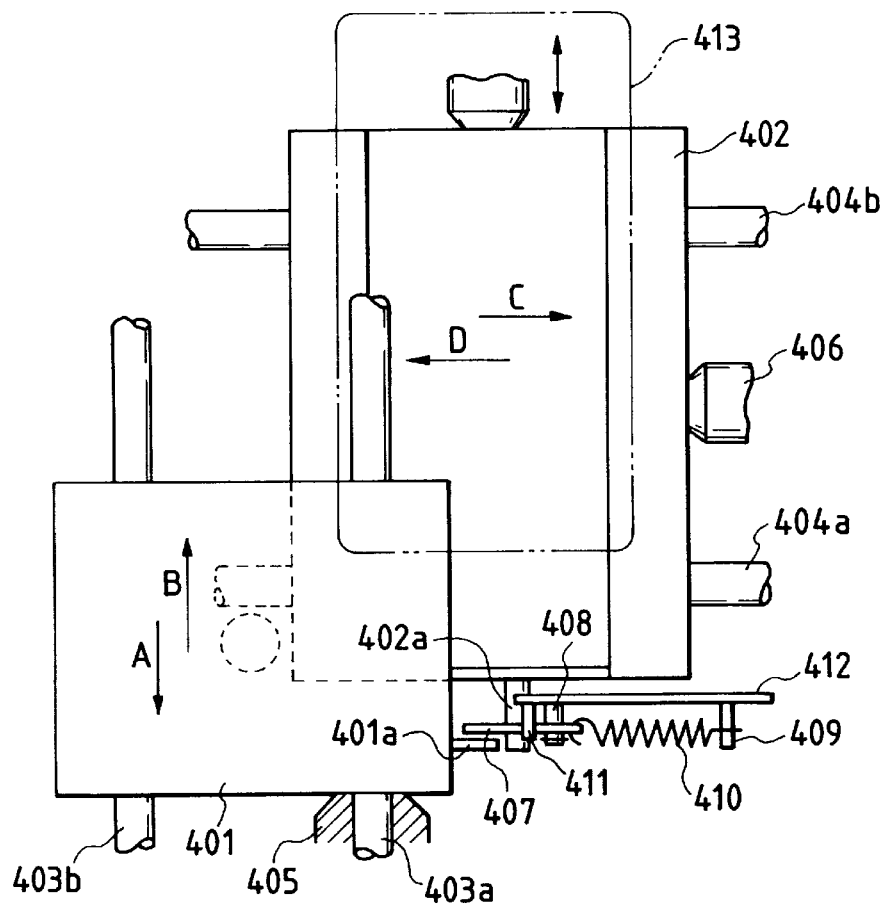
FIG. 30 is a plan view to show a modification of the fifth embodiment.
Figure 31:
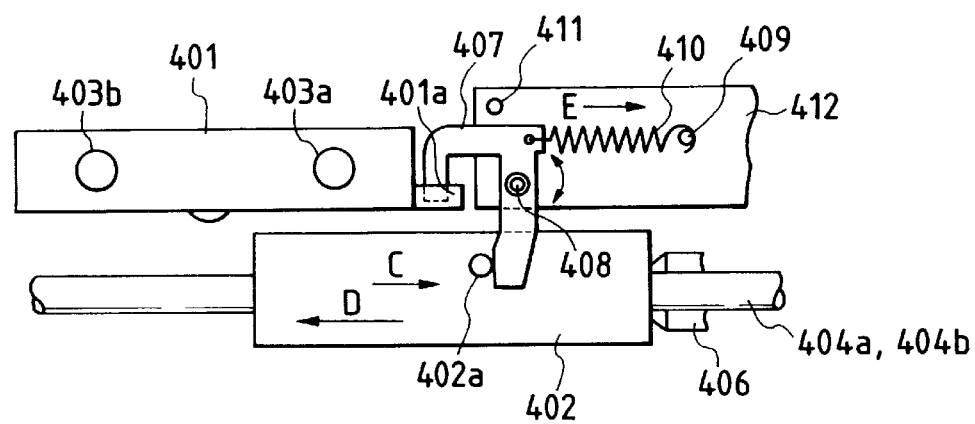
FIG. 31 is a front view of FIG. 30.

FIG. 30 and FIG. 31 show a modification of the fifth embodiment, which show a state in which the optical head 401 is locked. The fifth embodiment was so arranged that the shuttle 402 moved in the longitudinal direction of the optical card 413 and the optical head 401 in the transverse direction of the optical card 413, while the present modification is so arranged that the shuttle 402 moves in the transverse direction of the optical card 413 and the optical head 401 in the longitudinal direction of the optical card 413. The same constituents as those in the fifth embodiment are denoted by the same reference numerals and omitted is anexplanation the 8 arrangement and operations thereof.

Sixth Embodiment

Figure 32:
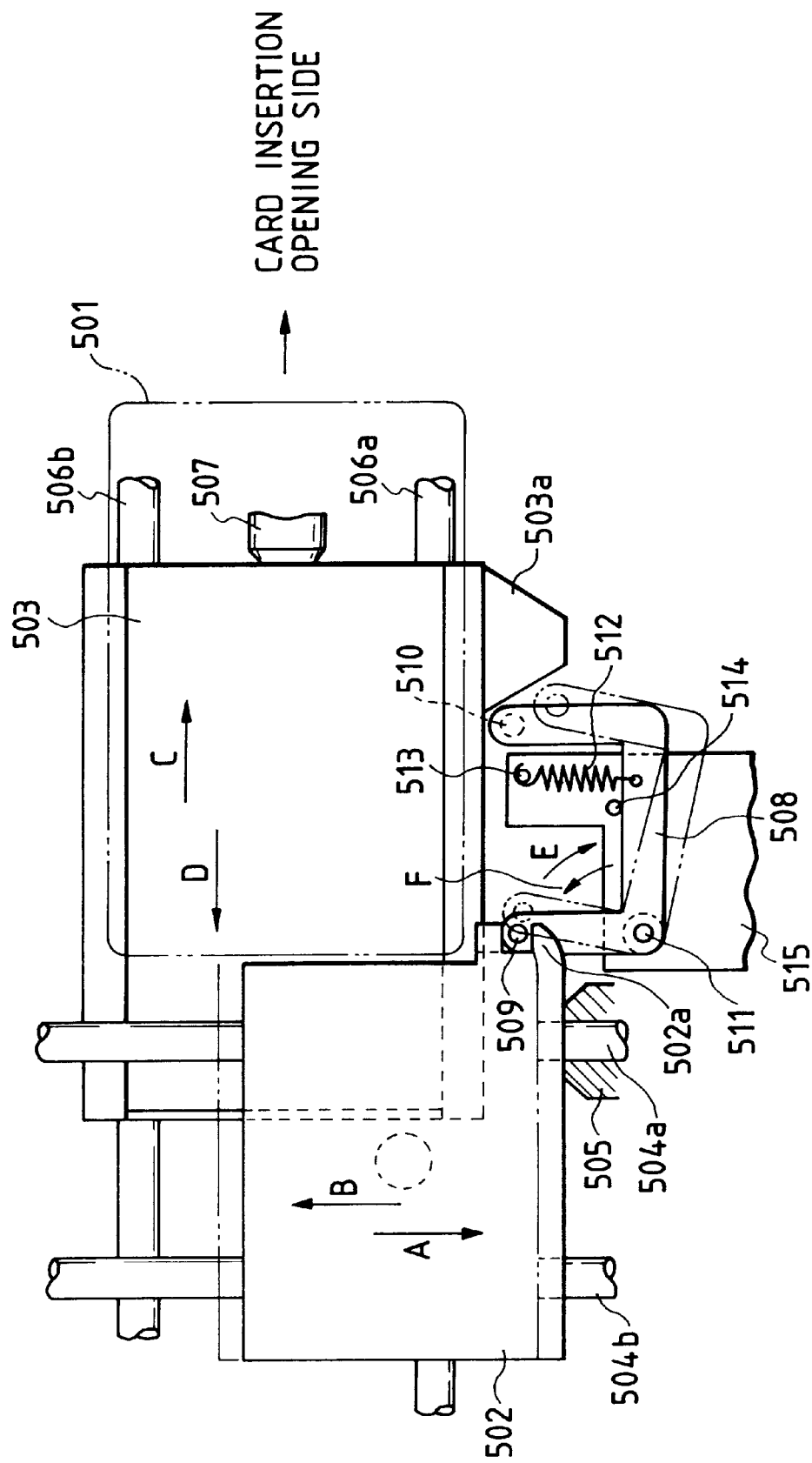
FIG. 32 is a plan view to show the sixth embodiment of the present invention.
Figure 33:
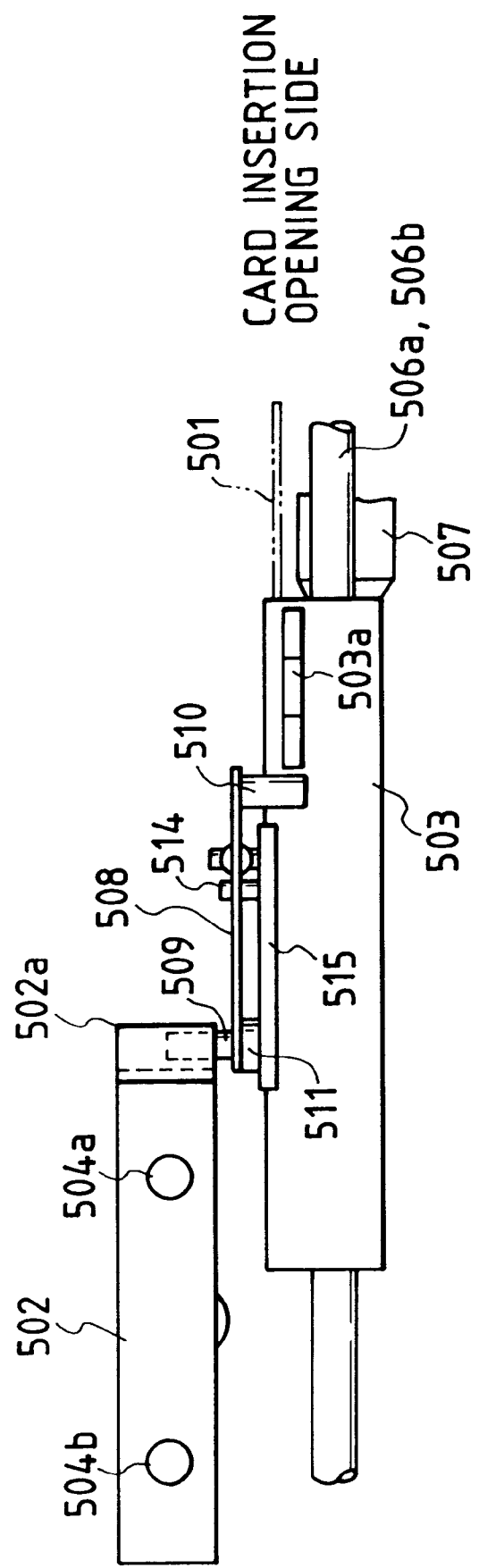
FIG. 33 is a front view of FIG. 32.

FIG. 32 to FIG. 35 show the sixth embodiment of the present invention. FIG. 32 and FIG. 33 show a state in which the optical head is locked, FIG. 34 a state in which the optical head is unlocked, and FIG. 35 a state in which the optical head is moved after being unlocked. In the drawings, reference numeral 501 designates an optical card, 502 an optical head for irradiating an optical beam, 502*a* a lock member formed on the optical head 502, 504*a*, 504*b* head guide shafts for guiding the optical head 502, and 505 a head stopper. The optical head 502 is arranged to be movable in the A and B directions along the head guide shafts 504*a*, 504*b*. The lock position of the optical head 502 is where the optical head 502 comes into contact with the head stopper 505.

Also, numeral 503 is a shuttle on which the optical card 501 is to be mounted, 503*a* a projecting member formed on the shuttle 503, 506*a*, 506*b* shuttle guide shafts for guiding the shuttle 503, and 507 a shuttle stopper. The shuttle 503 is arranged as movable in the C and D directions along the shuttle guide shafts 506*a*, 506*b*. The card insertion and discharge position of the shuttle 503 is where the shuttle 503 comes into contact with the shuttle stopper 507. A card slot is located on the right side in the drawings with respect to the shuttle 503.

Further, numeral 508 is a lock lever, 509 a lock pin, and 510 a lever pin. The lock pin 509 and the lever pin 510 are fixed on the lock lever 508. Also, numeral 511 is a lever shaft, 512 a tension coil spring, 513 a spring hook pin, 514 a stopper pin, and 515 a base plate. The lever shaft 511 and the spring hook pin 513 are fixed on the base plate 515. The lock lever 508 is arranged to be rotatable about the lever shaft 511. The tension coil spring 512 urges the lock lever 508 to rotate in the F direction. The rotation of the lock lever 508 is stopped when it comes into contact with the stopper pin 514.

The locking operation is next described in order in the above arrangement. In FIG. 32, the shuttle 503 first moves in the C direction from the recording/reproducing position and stops when it comes into contact with the shuttle stopper 507. This position is the card insertion and discharge position of the shuttle. The shuttle 503 is mechanically locked (not shown) at this position. Next, the optical head 502 moves in the A direction. When the optical head 502 reaches a position slightly before it contacts the head stopper 505, an urging force of the lock member 502*a* formed on the optical head 502 pushes up the lock pin 509 to rotate the lock lever 508 in the E direction against the biasing force of the tension coil spring 512. When the optical head 502 further moves to contact the head stopper 505, a groove in the lock member 502a comes to the position of the lock pin 509. Then, the lock lever 508 rotates in the F direction by the biasing force of the tension coil spring 512, so that the lock pin 509 enters the groove in the lock member 502a. This stops the optical head 502 from moving in the B direction and keeping it in a lock state. Finally, the optical card 501 is discharged from the shuttle 503 toward the slot.

Figure 34:
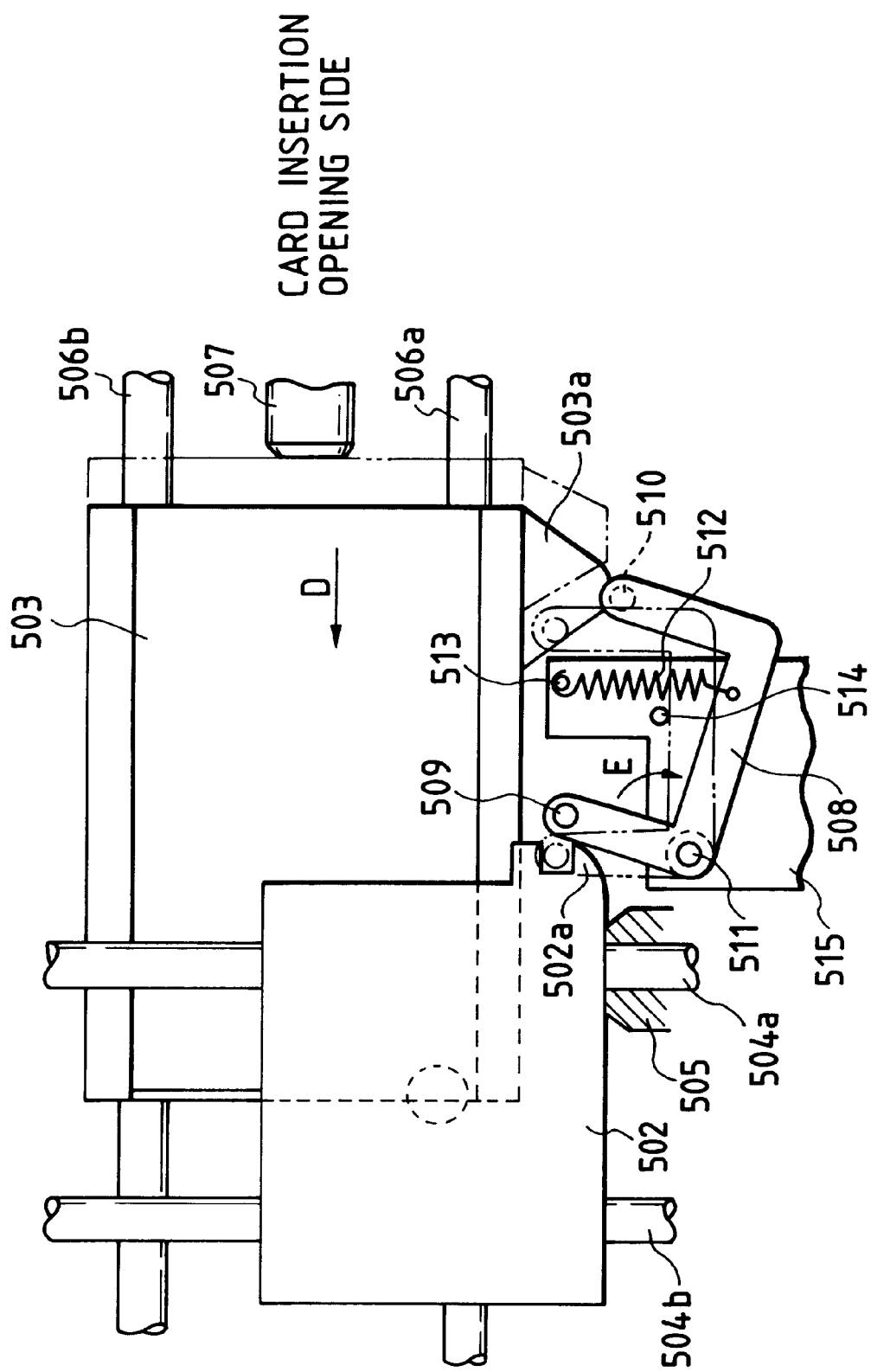
FIG. 34 is a plan view to show an operating state of FIG. 32.

The unlocking operation is next described referring to FIG. 34. In FIG. 34, when the optical card 501 is mounted on the shuttle 503, the shuttle 503 is released from the mechanical lock state (not shown). Then, the shuttle 503 starts moving in the D direction from the card insertion and discharge position where it is in contact with the shuttle stopper 507. In the next place, the projecting portion 503a formed on the shuttle 503 pushes the lever pin 510, whereby the lock lever 508 rotates in the E direction against the biasing force of the tension coil spring 512. At the same time, the lock pin 509 leaves the groove of lock member 502a. Thus, the optical head 502 is freed so as to move in the B direction as becoming unlocked.

Figure 35:
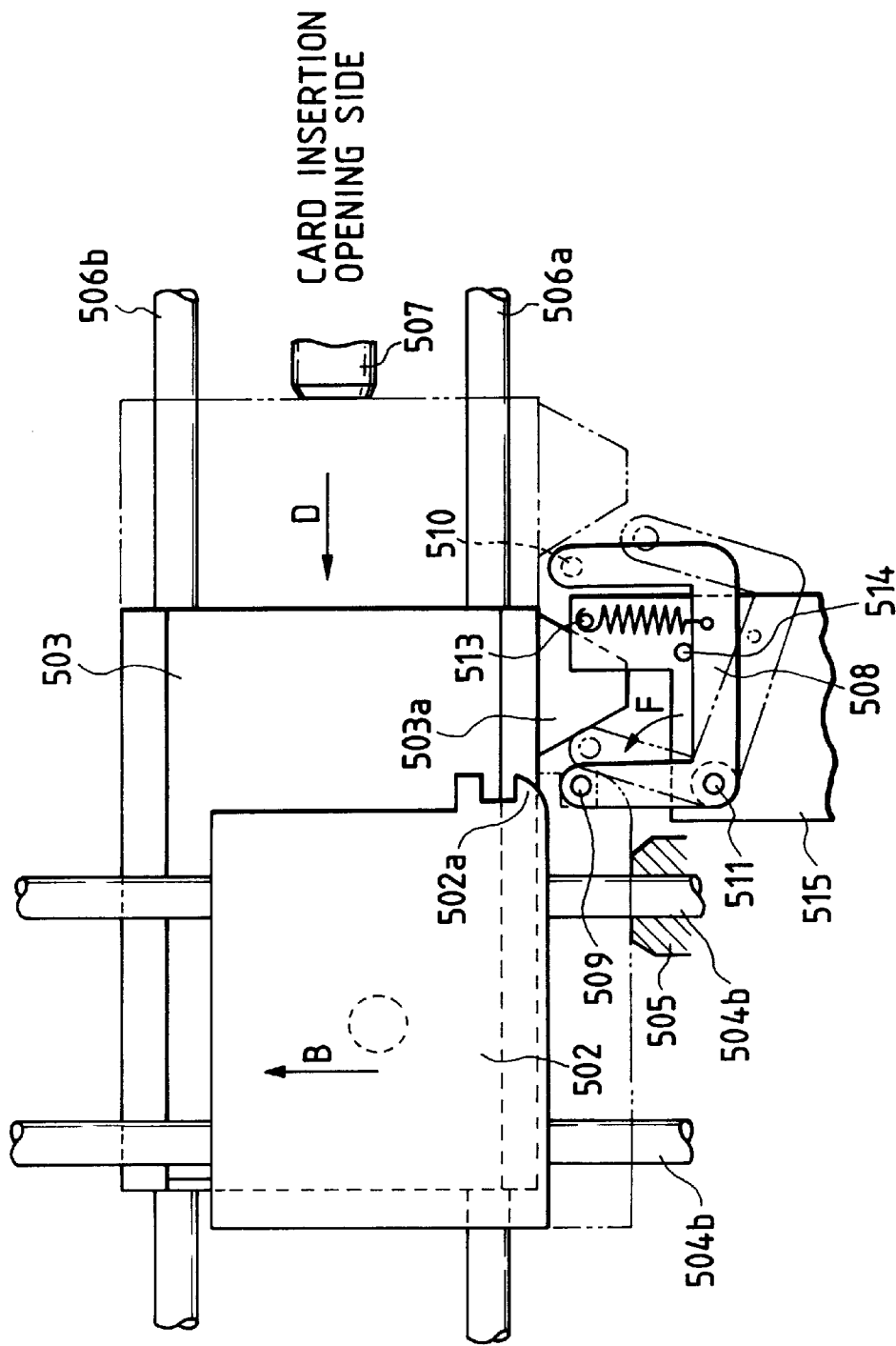
FIG. 35 is a plan view to show another operating state of FIG. 32.

In FIG. 35, the optical head 502 leaves the lock position and moves in the B direction. Further, the shuttle 503 moves in the D direction. When the projecting portion 503a passed by the lock pin 509, the lock lever 508 rotates in the F direction by the biasing force of the tension coil spring 512 up to the position where it comes into contact with the stopper pin 514, thus ending the unlocking operation.

Figure 36:
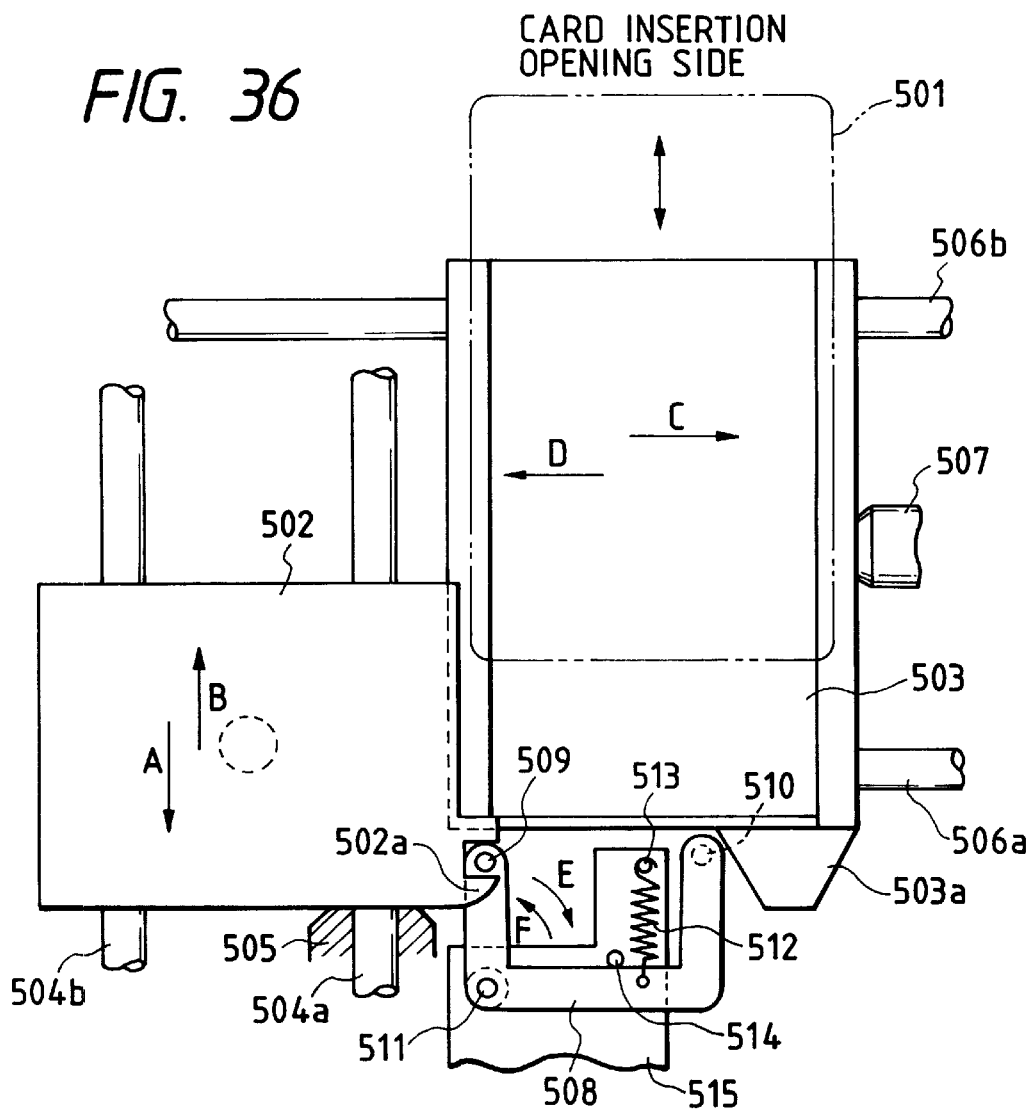
FIG. 36 is a plan view to show a modification of the sixth embodiment of the present invention.
Figure 37:
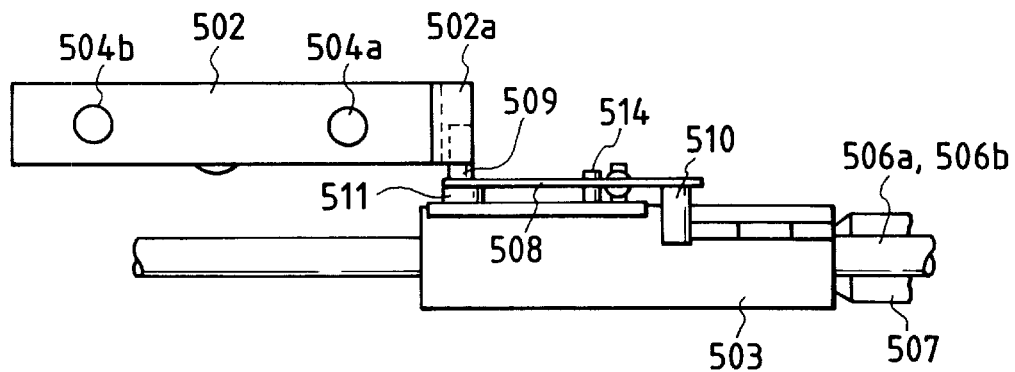
FIG. 37 is a front view of FIG. 36.

FIG. 36 and FIG. 37 show a modification of the sixth embodiment, which show a state in which the optical head 502 is locked. The sixth embodiment was so arranged that the shuttle 503 moved in the longitudinal direction of the optical card 501 and the optical head 502 in the transverse direction of the optical card 501, while the present modification is so arranged that the shuttle 503 moves in the transverse direction of the optical card 501 and the optical head 502 in the longitudinal direction of the optical card 501. Since the arrangement other than the above is the same as that in the sixth embodiment, the same constituents as those in the sixth embodiment are denoted by the same reference numerals and omitted from explanation herein.

In the present invention, as described above, locking means is provided between the position of contact thereof with the optical card in the conveying path of the card and the shuttle/the optical head so that the shuttle and the optical head are locked or unlocked by an action of card press force upon discharge or insertion of the optical card, which requires no dedicated drive source for locking and which permits automatic locking or unlocking in synchronism with the discharge or insertion of the optical card.

Also, in the present invention, a common drive source can drive a drive unit for carrying the optical card onto the mounting base in the apparatus body or for carrying the optical card out of the apparatus body, and a drive unit for locking the shuttle and the optical head, which permits automatic locking or unlocking of the shuttle and the optical head in synchronism with the discharge or insertion of the optical card. Also, since the locking is possible without providing an extra drive source for the locking operation, the apparatus can be constructed in a compact size and at low cost.

Also in the present invention, the optical head may be locked upon pressing the ejection button, or it may be unlocked by inserting the optical card or by turning on the power, which permits automatic locking or unlocking without requiring complicated operations for locking.

Also in the present invention, the optical head may be locked in the arrangement that the shuttle and the optical head have the respective lock members which can engage with each other only at a predetermined position after the optical head and the shuttle are driven in the mutually perpendicular directions, which permits automatic locking without requiring special mechanisms or components for locking, with no dedicated drive source, without increasing the cost, but only by the simple operation.

Also in the present invention, the optical head may be locked in the arrangement that a projecting member is provided on the shaft, the urging force of the shuttle is made acting on the lock lever, and the lock lever is arranged as engaging with the lock member of the optical head, which permits automatic locking without requiring a complicated mechanism for locking, with no dedicated drive source for locking, and without increasing the cost.

Also in the present invention, the locking is effected by the urging force of the optical head and the unlocking by the urging force of the shuttle, which permits automatic locking without requiring a complicated mechanism for locking, with no dedicated drive source for locking, and without increasing the cost.

What is claimed is:

1. An information recording/reproducing apparatus for recording and/or reproducing information to or from a recording medium, comprising:

an optical head for irradiating an optical beam onto the medium to record and/or reproduce information thereto or therefrom, said optical head being movable along a surface of the recording medium;

a mounting base for holding the medium, said mounting base being movable in a direction perpendicular to a moving direction of said optical head;

a locking member for locking said optical head in an unmovable state;

a driving roller for conveying the medium between an insertion/ejection opening of said apparatus and said mounting base; and means for displacing said locking member between a position at which said optical head is locked and a position at which the locking state of said optical head is released by utilizing a rotational force of said driving roller and a rotational direction thereof.

2. An information recording/reproducing apparatus for recording and/or reproducing information to or from a recording medium, comprising:

an optical head for irradiating an optical beam onto the recording medium to record and/or reproduce information thereto or therefrom, said optical head being movable along a surface of the medium and having a receiving member;

a mounting base for holding the recording medium, said mounting base being movable in a direction perpendicular to a moving direction of said optical head;

a locking member for locking said optical head to be immovable in a direction along a surface of the recording medium by coming into contact with said receiving member when the recording medium is being ejected from the apparatus; and conveying means for conveying the recording medium through a conveying path from an insertion/ejection opening of the apparatus to said mounting base, wherein a part of said locking member is located in the conveying path, and when the recording medium is inserted into the apparatus, said part of said locking member comes into contact with a part of the recording medium so that said locking member is displaced to a position to release the locking state of said optical head.

3. An apparatus according to claim 2, wherein said locking member is adapted to lock said mounting base in an unmovable state.

4. An information recording/reproducing apparatus according to claim 2, wherein said receiving member is a groove formed in said optical head.

5. An information recording/reproducing apparatus for recording and/or reproducing information to or from a rectangularly-shaped card-type recording medium, comprising:

an optical head for irradiating an optical beam onto the recording medium to record and/or reproduce information thereto or therefrom, said optical head being movable within a predetermined range in a longitudinal direction of the recording medium;

a mounting base for holding the recording medium, said mounting base being movable in a transverse direction of the recording medium between an insertion/ejection position for inserting or ejecting the recording medium into or from said apparatus and a recording/reproducing position for effecting recording and/or reproduction to or from the recording medium;

a first locking member driven in synchronism with movement of said mounting base; and a second locking member provided on said optical head, wherein said first locking member comes into contact with and is received by said second locking member to lock said optical head in an immovable state when said optical head is located at one end of the predetermined range and said mounting base is located at the insertion/ejection position.

* * * * *

UNITED STATES PATENT AND TRADEMARK OFFICE
CERTIFICATE OF CORRECTION

PATENT NO. : 6,130,874
DATED : October 10, 2000
INVENTOR(S) : Makoto Saito

It is certified that error appears in the above-identified patent and that said Letters Patent is hereby corrected as shown below:

Title page,
Item [56], References Cited,

FOREIGN PATENT DOCUMENTS:
    "4013266    1/1992    Japan
    04238122    8/1992    Japan" should read -- 4-013266    1/1992    Japan
   4-238122    8/1992    Japan --; and
   "4238122    8/1992    Japan" (second occurrence) should be deleted.

Column 7,
Line 44, "the." should read -- the --.

Signed and Sealed this

Sixth Day of November, 2001

Attest:

NICHOLAS P. GODICI
Attesting Officer    Acting Director of the United States Patent and Trademark Office